US012498295B1

(12) United States Patent
Thompson et al.

(10) Patent No.: US 12,498,295 B1
(45) Date of Patent: Dec. 16, 2025

(54) INTELLIGENT VEHICLE VIBRATION ANALYZER

(71) Applicants: Bernie C Thompson, Tijeras, NM (US); Neal R Pederson, Los Alamos, NM (US)

(72) Inventors: Bernie C Thompson, Tijeras, NM (US); Neal R Pederson, Los Alamos, NM (US)

(73) Assignee: AUTOMOTIVE TEST SOLUTIONS INC., Albuquerque, NM (US)

(*) Notice: Subject to any disclaimer, the term of this patent is extended or adjusted under 35 U.S.C. 154(b) by 817 days.

(21) Appl. No.: 17/016,103

(22) Filed: Sep. 9, 2020

Related U.S. Application Data

(60) Provisional application No. 62/911,738, filed on Oct. 7, 2019.

(51) Int. Cl.
G01M 13/028 (2019.01)
G01M 13/02 (2019.01)
(Continued)

(52) U.S. Cl.
CPC .......... G01M 13/028 (2013.01); G01M 13/02 (2013.01); G01M 13/022 (2013.01); G01M 13/023 (2013.01); G01M 13/045 (2013.01); G01M 15/12 (2013.01); G01M 17/025 (2013.01); G01M 17/04 (2013.01);
(Continued)

(58) Field of Classification Search
CPC .. G01M 13/028; G01M 13/02; G01M 13/022; G01M 13/023; G01M 13/045; G01M 15/12; G01M 17/025; G01M 17/04; G01P 15/18; G07C 5/004; G07C 5/006; G07C 5/008; G07C 5/0808; G07C 5/0816; G07C 5/0825; G07C 5/0833; G07C 5/0841; G07C 2205/02
See application file for complete search history.

(56) References Cited

U.S. PATENT DOCUMENTS 4,463,427 A * 7/1984 Bonnetain .............. F16H 63/42
701/123
5,596,496 A * 1/1997 Loeffler .............. G01M 13/028
476/2

(Continued)

OTHER PUBLICATIONS

Loc Luu and Anh Dinh, Artifact Noise Removal Techniques on Seismocardiogram Using Two Tri-Axial Accelerometers, 2, Apr. 2018, Sensors 18, No. 4, p. 7 (Year: 2018).*

(Continued)

Primary Examiner — Vivek D Koppikar
Assistant Examiner — Jeffrey R Chalhoub
(74) Attorney, Agent, or Firm — V Gerald Grafe

(57) ABSTRACT

It has long been known that rotating components can produce unwanted vibrations. When these vibrations are produced by components within a vehicle it can be very difficult to determine where the vibration is emanating from. The present invention is one that locates the origin of a vibration that is produced from rotating components within a vehicle. This vibration analyzer can accurately locate and identify which component or components are creating the excessive vibrations on the vehicle under test. This is accomplished by the use of four vibration sensors that are located at each corner of the vehicle on the suspension.

11 Claims, 28 Drawing Sheets

(51) Int. Cl.
*G01M 13/022* (2019.01)
*G01M 13/023* (2019.01)
*G01M 13/045* (2019.01)
*G01M 15/12* (2006.01)
*G01M 17/02* (2006.01)
*G01M 17/04* (2006.01)
*G01P 15/18* (2013.01)
*G07C 5/00* (2006.01)
*G07C 5/08* (2006.01)

(52) U.S. Cl.
CPC .............. *G01P 15/18* (2013.01); *G07C 5/004* (2013.01); *G07C 5/006* (2013.01); *G07C 5/008* (2013.01); *G07C 5/0808* (2013.01); *G07C 5/0816* (2013.01); *G07C 5/0825* (2013.01); *G07C 5/0833* (2013.01); *G07C 5/0841* (2013.01); *G07C 2205/02* (2013.01)

(56) References Cited

U.S. PATENT DOCUMENTS

| | | | | |
|---|---|---|---|---|
| 6,729,186 B1 * | 5/2004 | Sirrine | ...................... | G01H 1/10 73/659 |
| 7,487,679 B2 * | 2/2009 | Sirrine | ...................... | G01H 1/10 73/659 |
| 7,556,585 B2 * | 7/2009 | Landes | ................... | F16H 61/16 477/110 |
| 2002/0120365 A1 * | 8/2002 | Bokar | ..................... | G01B 5/255 700/279 |
| 2003/0088346 A1 * | 5/2003 | Calkins | .................. | G01H 1/003 73/78 |
| 2005/0066730 A1 * | 3/2005 | Raichle | .................. | G01N 29/46 73/579 |
| 2010/0138107 A1 * | 6/2010 | Morris | .................. | B60W 10/16 701/36 |
| 2012/0188105 A1 * | 7/2012 | Alkhalaf | ............. | B60R 16/0232 340/989 |
| 2018/0082492 A1 * | 3/2018 | Stanek | ................. | G07C 5/0808 |
| 2019/0353506 A1 * | 11/2019 | Yoda | ....................... | G01P 1/023 |

OTHER PUBLICATIONS

Artifact Noise Removal Techniques on Seismocardiogram Using Two Tri-Axial Accelerometers, 2, Apr. 2018, Sensors 18, No. 4, p. 7 (Luu) (Year: 2018).*

* cited by examiner

Tire size

(#1 x #2 / 2540 x 2) + (#3)

Width x Height / 2540 x 2 + wheel diameter = Tire Diameter

Tire Diameter x 3.1416 = Tire Circumference (in inches)

285/75/R16 = 285 Width / 75 Height / Wheel Radius16 = Tire Diameter 285 x 75 = 21375    21375 / 2540 = 8.41    8.41 x 2 = 16.83    16.83 + 16 = 32.83 Inch Tire Diameter = 32.8 inch 32.83 x 3.1415 = 103.13 inches circumference There are 63,360 inches in a mile 63,360 / 103.13 = 614.37 revolution per miles 614.37 x 60 MPH = 36862 revolution per hour    3600 second per hour 36862 / 3600 = 10.23 Hz tire rotation rate 10.23 Hz x 60 sec = 614.3 Tire RPM

Figure 9

Figure 10

INTELLIGENT VEHICLE VIBRATION ANALYZER

CLAIM OF PRIORITY

This application is a continuation-in-part of and claims the priority of provisional application Ser. No. 62/911,738 filed Oct. 7, 2019.

FIELD OF INVENTION

A vehicle's rotating components can produce unwanted vibrations. The present invention is one that locates the origin of a vibration that is produced from rotating components within a vehicle. This diagnostic tool, referred to as the Intelligent Vehicle Vibration Analyzer (IVA), can accurately locate and identify which component or components are creating the excessive vibrations on the vehicle under test. This is accomplished by the use of four vibration sensors that are located on a suspension component at each corner of the vehicle. These vibration sensors quickly attach with a magnet to the control arms, leaf springs and/or axles. Once attached, the data from the four sensors is processed with algorithms running in a microprocessor.

BACKGROUND OF THE INVENTION

It has long been known that rotating components can produce unwanted vibrations. When these vibration are produced by components within a vehicle it can be very difficult to determine where the vibration is emanating from. Vehicles contain many rotating components, for example; tires, wheels, hubs, rotors, drums, axle shafts, drive shafts, transmissions, differentials, pumps, generators, and engines, just to name a few. These components are balanced to assure that they will not create vibrations. However from either imbalance, wear, or poor design, vibrations can and will be present in vehicles.

Therefore it will be necessary to locate these unwanted vibrations. There have been many different methods used in order to find what is causing the vibration(s). The Sirometer (Vibration Tachometer) is a manual tool originally used for reading small engine Revolutions Per Minute (RPM). This tool is highly accurate and has enough range to measure most vibration frequencies that occur in a vehicle. The Sirometer uses two dials, one that reads the RPM and one that reads frequency (Hz). A hard wire is fed out of the Sirometer. When this wire is adjusted to the correct length it will resonate at the frequency of the vibrating component that it is attached to. This will provide the service person with the frequency of the vibration that is occurring within the vehicle. The service person will use this information and a few basic math equations in order to try to locate the source of the vibration.

This method has several problems associated with it. The first problem is that if the vehicle has multiple vibrations that occur at the same time, only one can be found. For instance, the wheels and tires are rotating at one RPM or frequency (Hz), the driveshaft is rotating at another RPM, the transmission is rotating at another RPM, and the engine is rotating at yet another RPM. If a wheel and tire (wheel assembly) is out of balance and producing a heavy vibration and the driveshaft is also producing a vibration, the Sirometer will be unable to find both vibrations at once.

The second problem occurs because vehicles have more than one wheel assembly. Since the Sirometer only indicates that a vibration is at the rotational frequency of the wheels and tires, it cannot indicate which wheel assembly has the vibration occurring. This means that any one of the four wheel assemblies could have a problem. Much like the Sirometer, a good service person can test drive a vehicle, feel the frequency that the vibration is occurring at, and determine if it is at the rotational speed of the wheels and tires just through the feel of the vibration. However the outcome is still the same, the service person still does not know which one of the wheel assemblies is causing the vibration.

The third problem occurs when the vehicle has a vibration under braking. If the vibration is occurring during breaking the vibration time can be short and the frequency can be changing as the vehicle slows, which makes adjusting the Sirometer very difficult to impossible. Since the vibration occurs when the brakes are being applied it is obvious that the brake application is creating the vibration, but the vibration frequency does not indicate which brake that is actually creating the vibration. Any one of the brake assemblies could be causing the vibration. Additionally a suspension component can cause vibrations under braking as well.

Yet another method is if an Analog to Digital Converter (ADC), Data Acquisition Device (DAQ), or oscilloscope is used with a vibration sensor. In this method a vibration sensor is placed on the vehicle. This is commonly placed on the driver seat mounting rail. The vehicle is then test driven and the data is recorded. This data is then processed and the frequencies of the rotating components is analyzed.

It would appear that this advanced electronic method would produce superior results, however this is not the case. This method still has many of the same problems that a good service person or the Sirometer has. With this method the data provided can only indicate that a vibration is present at the frequency of the rotating component. In other words, it can detect that a vibration is occurring at the RPM a wheel assembly is currently rotating at. It cannot indicate which wheel assembly has a vibration, only that one or more of the wheel assemblies is currently vibrating.

Additionally, if the vibration is occurring under braking there is no way to identify which one of the brake components is creating the vibration. This method only indicates that there is a problem with the brakes. This is no more helpful than a good service person listening and feeling for the problem.

Furthermore, if the vehicle is a four wheel drive that incorporates two drive shafts (front and rear) it cannot detect which driveshaft is vibrating. Only that the vibration is occurring at the frequency that the driveshaft's are rotating at.

What is needed is a method that can determine which component, and/or components, has a vibration issue. In other words, a method that identifies which wheel assembly the vibration is emanating from. For example if the Left Front (LF) wheel assembly is vibrating the device will automatically indicate this. It is important that this device locate and identify multiple vibrations. In other words, if two wheel assemblies are vibrating this device should determine which two wheels have excessive vibrations. For example, if the Left Front (LF) and Left Rear (LR) are both vibrating this device would automatically indicate this. Additionally if a wheel assembly and a drive shaft have a vibration issue this device would determine this and clearly indicate that the wheel and drive shaft have a vibration issue. The current invention can provide these results.

SUMMARY OF THE INVENTION

The present invention relates to testing a vehicle for unwanted vibration issues. The preferred method of the present invention uses a vibration sensor at each wheel assembly to measure the forces at the component. In order to test the force we will need a sensor that can provide such a measurement. Accelerometers are one such sensor that can read mechanical force. An accelerometer is a very sensitive device that can measure proper acceleration. Proper acceleration is the acceleration or the rate that an object changes its velocity. For example, an accelerometer at rest on the surface of the Earth will measure an acceleration due to the Earth's gravity.

Typical accelerometers are made up of multiple axis; two to determine most two-dimensional movement with the option of a third for 3 Dimensional (3D) positioning. Accelerometers used for the IVA are 3D and can read force in three planes of movement, X, Y, and Z. With an X-Y-Z coordinate system; the X-axis would go from front to back, the Y-axis would go from left to right, and the Z-axis would go from up to down. The IVA accelerometers are called smart sensors. This refers to the sensor being able to provide all three axis of data to the microprocessor without the need for proper orientation of the sensor. In the preferred method this is accomplished through a single signal wire within a cable. This preferred cable will contain a power, ground, and sensor output. The senor output will contain the data from all of the X-Y-Z axis combined. The smart sensors will not require proper orientation, in other words, the sensor will not have to be installed in a certain position. In the preferred embodiment this is accomplished by summing the X-Y-Z accelerometer outputs. The X-Y-Z axis outputs are summed so the combined amplitude of all three axis is sent through the wire to the ADC to be read by the microprocessor. Now a single cable can carry all the X-Y-Z data to the DAQ. In this preferred method the accelerometer can convey the vibration forces from the component that it is attached to with a single wire and ADC channel. Therefore, the IVA can monitor all 4 sensors X-Y-Z axis with, 4 wires, and 4 ADC's. If the accelerometer were not summed one would need 12 wires and 12 ADC channels in order to monitor the outputs of all four sensors. Another desired benefit of summing the X-Y-Z axis is that there is no sensor orientation required. It can be difficult to impossible to have a specific orientation for many of the locations that an accelerometer will be located on the vehicle.

Prior art sensing techniques would require the sensor to have proper sensor orientation. With proper orientation, if a 12 channel system were used then all axis could be monitored. However, this is not what prior art does. Prior art shows the sensor is read with only one channel allowing only one of the X-Y-Z axis to be read from the sensor. This brings about several problems. First, if the service person does not have the sensor in the proper orientation the sensor will not provide the correct data needed to locate the vibration. Second, the sensor will only read a single axis which could miss the vibration force for the direction it is occurring in.

Another method that could be used to read the X-Y-Z outputs is by using a microprocessor that is contained in the same housing as the accelerometer. This microprocessor can then send the information for each of the X-Y-Z planes across a single signal wire. Wireless systems such as, but not limited to, Bluetooth can also be utilized to transmit the X-Y-Z data planes. One versed in the art would understand that there are many ways to accomplish this.

A vehicle containing four wheel assemblies would have four individual vibration sensors with each sensor placed on a suspension component at each wheel, as illustrated in FIG. 1. These sensors incorporate a powerful molybdenum magnet that will allow the vibration sensor to be quickly attached to one of the suspension components such as, but not limited to; lower control arm, upper control arm, shock absorber, strut assembly, leaf spring, steering knuckle, and/or differential housing. If the attaching point is not that of a ferrous metal, a ferrous metal C-clamp is used. This is where a C-clamp is tightened to the component(s) allowing the sensor's magnet to hold the sensor in place on the C-clamp.

In this method the vibration sensors will produce an electrical output that is proportional to the vibration of each suspension component on the vehicle. Therefore, each individual sensor will provide data based on its location as shown in FIG. 2. In this example the sensors are attached to the two front lower control arms and the two rear leaf springs. The rear end consists of a single differential housing, therefore, the wheel assembly that is vibrating is seen on both rear sensors. However, the wheel assembly that has a greater output is the one the vibration is emanating from. So the IVA monitors the frequency the component is rotating at, and then monitors the greatest amplitude produced from each vibration sensor at the correct frequency. The IVA program then automatically uses this data to determine where the vibration is emanating from. The amplitudes produced from each vibration sensor are compared to each other and to a preprogramed threshold. These thresholds are programed so that if there is no to low vibration then the component background on the screen display is shown in white. If the vibration is a light vibration then the component background is shown in yellow. If the vibration is moderate then the component background is shown in orange. If the vibration is heavy then the component background is shown in red. In this way the service person can easily see the vibration level. Additionally a digital number, which is based on the vibration sensor's amplitude, is shown that corresponds to the vibration level or harness level.

In this way the vibration can be isolated to the rotating component that created it. If the rear driveshaft is vibrating then both sensors in the rear will have a greater amplitude at the frequency of the driveshaft rotational speed. The frequency of the driveshaft is different from that of the frequency of the wheel assemblies due to the rear differential gearing. Therefore the IVA can identify the frequency of the driveshaft and the frequency of the wheel assembly at the same time. Once the frequency of the components are known, then a threshold can be programed that, if crossed, will indicate there is excessive vibration of the component. This will be explained in detail below.

Furthermore, an engine vibration issue can be determined. To determine an engine vibration problem the RPM will need to be converted to revolutions per second (Hz). This is done by dividing the RPM by 60 seconds. So if the RPM is 800; 800 RPM/60 seconds=13.33 Hz. If an accelerometer is placed on the engine and other accelerometers are placed next to each engine mount on the frame or supporting structure, a bad engine mount can be determined. The engine mounts are design to absorb vibration from the engine. For example, if the engine vibration has an amplitude of 16 produced from the vibration sensor, at 13 Hz, then the other accelerometers should read less than half of the engine amplitude, at 13 Hz, or about an amplitude of 8. This would show that the engine mounts are absorbing the engine's vibration. If the accelerometer next to the mount is reading about the same as the engines sensor, the mount is bad or is in a bind where it cannot work correctly.

Additionally, one of the driven components on the engine can also cause a vibration. If the diameter of the pulleys are known then one can calculate the rotational speed of each pulley, as shown in FIG. 3. With the accelerometer mounted on the engine the output data from the accelerometer can be processed with a Fast Fourier Transform (FFT). Now each component can be monitored at its rotational speed. If there is a problem the amplitude at the pulley's frequency (Hz) output will show which component is creating the vibration. If the engine is creating the vibration then the rotational speed of the engine in Hz will produce the greatest amplitude at that Hz reading.

Additionally it has been found that if a vibration sensor and a microphone are used together a more actuate means to find a bad component can be accomplished. Since sound and vibration are both frequencies, when an FFT is run on both types of sensors it will show the components Hz in amplitude. If both sensors locate the same component's rotational speed, there is a high probability this component is causing the problem. If two components have the same size pulley then the component will need to be operated in order to determine where the vibration is emanating from. For example if the air conditioning (A/C) and power steering have the same size pulley; the A/C is turned on and off, then the steering wheel is turned. The component that is bad will have a greater vibration under the load when it is applied.

The IVA looks for; first order, second order, third order, and fourth order vibrations, as shown in FIG. 4. A first order vibration is where the vibration is occurring at the frequency of the rotating component. A second order vibration is where the vibration is occurring at two times the rotation frequency of the rotating component. A third order vibration is where the vibration is occurring at three times the rotational frequency of the rotating component. A fourth order vibration is where the vibration is occurring at four times the rotational frequency of the rotating component. Once the IVA locates the vibration frequency, the vibration is checked for the amplitude of the signal. The amplitude is used to indicate the severity or harness of the vibration(s). Color coding is used as a method to show the severity of the vibration with color. The colors used are; white, yellow, orange, and red. This will automatically alert the service person that there is a problem.

It is important to understand that when the vehicle is exhibiting a vibration the entire vehicle is vibrating. This is why a sensor placed at the driver seat can sense the vibration that is occurring somewhere on the vehicle. If several other sensors are placed on the vehicle then all of the sensors will indicate a vibration occurring somewhere on the vehicle. Additionally on a rough road these sensors will all see this vibration as well, which can make the other sensors appear that this is where the vibration is emanating from. It has been found through extensive testing that it is very difficult to determine where the vibration is actually coming from. Therefore when using multiple sensors algorithms are required in order to calculate the origin of the vibration. One such algorithm is seen in FIG. 4 where during the time that each sensor is above a preprogramed threshold the history of the vibration is recorded, monitored, and displayed. The sensor that is on the vibrating component will have the greatest amplitude for the greatest amount of time. Only the sensor that has these amplitude and time thresholds broken are shown in color, thus indicating which component is vibrating and the severity of the vibration. This is referred to as vibration history When the vibration sensors are located on the suspension component the vibration is much greater than when it is located on the driver seat. Therefore the IVA program will change the thresholds for the vibration sensor's amplitude and severity depending on where the sensor's mounting location is. When the IVA program initiates it will prompt the service person to setup the vehicle that is going to be tested. This will include; Tire size, Gear ratios, Drive type, Sensors used, and Location of the sensors, this is shown in FIG. 5. The tire size and ring and pinon ratio must be known for the vibration to be identify.

It is important to understand that each of these selections will change the IVA program by changing variables the program uses to detect vibrations and problems. One such example is the selection of the drive type. Selecting a drive type; Front Wheel Drive, Rear Wheel Drive, Four Wheel Drive, or All-Wheel Drive, will change the IVA program. For example, if the drive type selected is a Front Wheel Drive, the IVA program will be changed. In this program setting there are no drive shafts but half shafts within the vehicle. These half shafts will rotate at tire and wheel speed. The component that will rotate at driveshaft speed is within the transaxle itself. Therefore the IVA program will call out the transmission final drive vibration.

If the drive type selected is a Rear Wheel Drive vehicle, the IVA program will be changed. With this configuration there is a driveshaft from the transmission to the rear differential. The IVA program will now test for a rear driveshaft vibration. When a vehicle has a driveshaft and the transmission shifts into a 1.1 ratio, the IVA program will only call out that the driveshaft is causing the vibration. At this gear ratio the transmission, driveshaft and engine are all turning at the same speed. If the engine or transmission is creating the vibration they will also have the vibration in other gears as well. In this case the probability is higher that the driveshaft is creating the vibration, so the driveshaft is the only component called out.

If the drive type is a Four Wheel Drive vehicle the IVA program will be changed. In this configuration there are two drive shafts; one from the transfer case to the rear differential, and one from the transfer case to the front differential. In this case the IVA program will watch the driveshaft speed and then compare the four sensors. If one of the drive shafts is out of balance, the entire vehicle will vibrate. In order to determine which shaft is out of balance the IVA program compares the front sensors with the rear sensors. If the vibration sensors in the front are less than 70 percent of the rear sensors, then the vibration is coming from the rear drive shaft. If the front vibration sensors are greater than 70 percent of the rear sensors then the vibration is coming from the front driveshaft.

If the drive type is an All-Wheel Drive vehicle the IVA program will be changed. In this configuration there is a transmission final drive and one drive shaft from the transfer case to the rear differential. In this case the IVA program will watch the driveshaft speed and then compare the four sensors. In order to determine which shaft, transaxle or driveshaft, is out of balance the IVA program compares the front sensors with the rear sensors. If the vibration sensors in the front are less than 55 percent of the rear sensors, then the vibration is coming from the rear drive shaft. If the front vibration sensors are greater than 55 percent of the rear sensors then the vibration is coming from the transaxle. In this way the IVA program can automatically identify and alert the service person to what is creating the vibration.

Additionally the "Sensors to Use" and sensor "Location" will need to be selected. This will allow the IVA program to change based on the number of sensors used and the location of the sensor. "Sensors Used" will be one of; One Sensor, Two Sensor, and Four Sensor. Sensors "Location" will be one of; Driver seat, Wheel/Suspension, Engine, Transmission, Front Driveshaft, and Rear Driveshaft. For example if One Sensor is selected and the location is the driver seat, then the IVA program can only give data on the type of vibration that is occurring. In other words, the IVA program can only indicate that there is a tire and wheel vibration, but cannot indicate which tire and wheel. The IVA program can indicate there is a driveshaft vibration, but cannot indicate which driveshaft. The IVA program can indicate there is an engine vibration present. The IVA program is limited in this configuration.

If Two Sensor mode is selected then the IVA program changes; sensor 1 (LF) and sensor 2 (RF), will now be compared against each other. The IVA program then marks the highest value of the two with color coding. This will allow the service person to locate where the vibration is coming from. For example, if in Four Sensor mode the rear driveshaft is found to be vibrating then the Two Sensor mode would be used. The service person would move the front two sensors to the following locations: sensor 1 (LF) (Yellow) would be placed on the transmission or transfer case, and sensor 2 (RF) (Red) would be placed on the rear differential. Now the location of the sensor is selected. This will allow the IVA program to monitor the frequency of the selected component. In this example the rear driveshaft would be selected, however if one of the other selections were made the IVA program would only monitor near the frequencies of that component selected. The IVA program will now only monitor and display the driveshaft Hz. If the rear sensor has the greatest amplitude then the vibration is being emitted from the rear of the driveshaft or rear differential. If the front sensor has the greatest amplitude then the vibration is being emitted from the front of the driveshaft, transmission or transfer case.

When Four Sensor is selected the IVA program will allow all four vibration sensors to be analyzed simultaneously, and analyzing such data with "Wheel and Suspension" selected allows, wheel and suspension, engine, transmission, front driveshaft and rear driveshaft to be monitored and analyzed at the same time. This will allow the IVA program to locate the origin of the vehicle's vibration. If any of the other "Sensors to Use" are selected only the frequency of the selected sensor is analyzed. For example, if the "Engine" is selected with "Four" sensor selected, the IVA program will only analyze vibrations that are near the frequencies of the engine's rotational speed or RPM. Then the four sensors can be used to isolate the origin of the vibration. In this program mode sensor 1 (LF) will be placed on the engine. The other vibration sensors, sensor 2 (RF), sensor 3 (LR), Sensor 4 (RR), will be placed by the engine mounts on the frame or supporting structure. The IVA program now compares the other sensors with sensor 1 and the greatest amplitude from one of the other sensors will be color coded blue. This will alert the service person to which engine mount or transmission mount is impaired.

When the "Sensors Used" and "Location" are selected the vehicle display will automatically display where the sensors will need to be placed. This will help guide the service person to place the sensors correctly. Once the sensors are placed the IVA program will automatically monitor the component or components, and indicate or alert where the vibration is coming from. This will be accomplished on a diagram of a vehicle and on a display with the components name next to it, as shown in FIG. 6. These are alert lamps that are color coded to the severity and location of the vibration. The data is displayed in several graph formats as well. Additionally, the IVA program will automatically alert the service person with sound. This sound alert is an audio voice that indicates the components that are vibrating, and the severity of the vibration. This helps when driving the vehicle so the service person is not watching the IVA display. Additionally there is a button that can be pushed when the service person feels the vibration. Once this button is pushed the IVA program records 5 seconds of data before the button was pushed and 5 seconds of data after the button was pushed. These features will allow the service person, from novice to expert, to understand where the vibration is being emitted from.

Prior art only allows the service person to know a vibration is at a given frequency, but does nothing to show where it is coming from. This process of automatically determining the origin and severity of the vibration is innovative and novel. It would also be apparent that one versed in the art could make alteration to the invention that would accomplish the same outcomes.

BRIEF DESCRIPTION OF THE DRAWINGS

FIG. 9 shows the equation to determine tire circumference and tire rotational speed.

FIG. 10 shows the drop down menu for selecting the ring a pinion gear ratio.

FIG. 22 shows the four wheel drive in FIG. 21 using the Two Sensor mode to locate where the vibration is coming from.

DESCRIPTION OF THE PREFERRED EMBODIMENT

Figure 7:
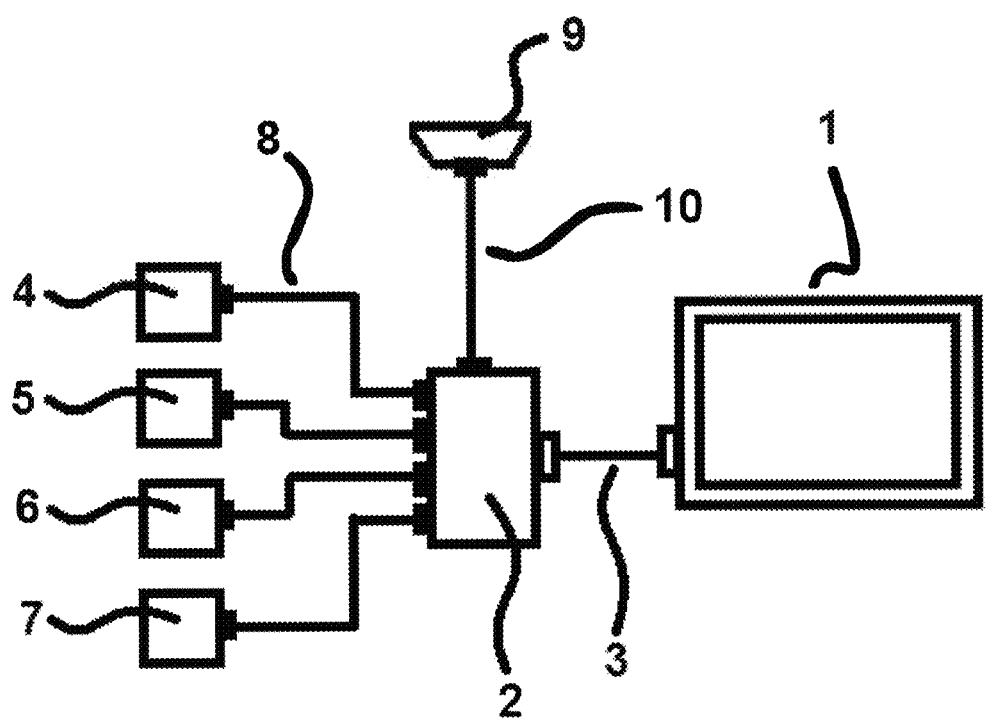
FIG. 7 illustrates the present invention.
Figure 8:
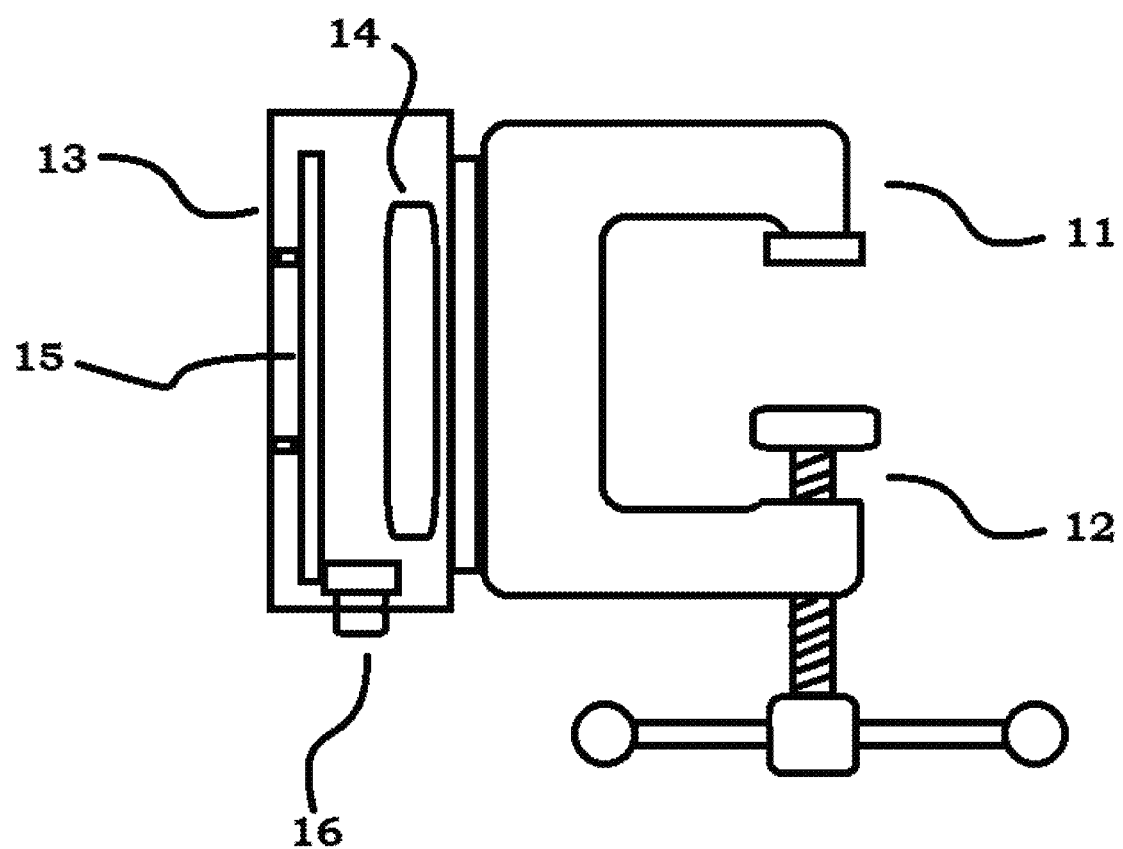
FIG. 8 shows C-clamp with sensor attached to it with magnetic.

The present invention is illustrated in FIG. 7. The microprocessor with display and interface screen (1) is connected to the Data Acquisition Device (DAQ) (2) with Universal Serial Bus (USB) cable (3). The data that is acquired in DAQ (2) is streamed across USB cable (3) to microprocessor (1). The microprocessor then runs a program that determines the vibration emanating from each of the vibration sensors (4) (5) (6) (7). The vibration sensors (4) (5) (6) (7) are accelerometers that are contained in aluminum cases with a strong magnet located inside each case. This magnet allows the sensor to be placed on suspension components (not shown) of a vehicle under test, quickly and easily. If the components that need to have a sensor attached to are not of a ferrous material, then a C-clamp is used as shown in FIG. 8. C-clamp (11) contains threaded holding fixture (12). Component is put between C-clamp (11) and threaded holding fixture (12). The clamp is then tightened to component. Vibration sensor (13) is an aluminum housing that contains circuit board with accelerometer (15) with stereo jack plug (16). Molybdenum magnet (14) holds sensor (13) to C-clamp (11) or vehicle component (not shown). The vibration sensors (4) (5) (6) (7) are attached to the Left Front (LF), Right Front (RF), Left Rear (LR), and Right Rear (RR) of the suspension components. The vibration sensors (4) (5) (6) (7) are connected with stereo jack cables (8) to the DAQ. Stereo Jack cables (8) use small cable magnets (not shown) to route and hold cables in place. The DAQ supplies vibration sensors (4) (5) (6) (7) with power and ground through cables (8). From this electrical current path an electrical output signal is produced that is proportional to the sensed vibration from each of the vibration sensors (4) (5) (6) (7). These signals are sent to DAQ (2) over stereo jack cables (8). The DAQ (2) then sends this data over USB cable (3) to the microprocessor with display and interface screen (1).

This data represents the vibration that is sensed at each suspension point, RF, LF, LR, and RR, of the vehicle under test. The accelerometer data is showing the movement of the sensor, and since the sensor is attached to the vehicle components it shows each movement of the component itself. More to the point, in this configuration the data shows the repetitious movement of the vehicle's components. For example, if a tire and wheel assembly is out of balance it will show a repetitious movement at the rate of the tire and wheel's rotational speed. Therefore the vibration amplitude and frequency from each suspension component can be used to determine where the vibration is emanating from.

In order to determine the frequency of the component the IVA connects to the vehicle under test (not shown). The IVA uses a Vehicle Communication Interface (VCI) (9) to connect to the DLC connector (not shown) to obtain data from the vehicle. This VCI (9) is a basic OBDII scan tool that can read the Parameter Identification Data (PID)'s from the Engine Control Module (ECM). The VCI (9) sends data on cable (10) to DAQ (2) that transmits this data across cable (3) to microprocessor (1). The data read from the vehicle is the Vehicle Speed Sensor (VSS) and engine Revolutions Per Minute (RPM). Additionally the IVA microprocessor can read the Vehicle Identification Number (VIN) through the VCI from the ECM. Additionally with this vehicle VIN the system can automatically load the correct data such as tire size, transmission gear ratios, and ring and pinion gear ratios. This data can also be manually loaded as seen below. Furthermore with the VIN data the correct sensitivity for the vehicle under test can be loaded as well.

In order to utilize the VSS and RPM the IVA program will need additional information. This information is the tire size and ring and pinion ratio. The tire size is given on the side wall of the tire; Width/Height/Wheel Radius. For example a tire with 285/75/16 on the side wall has 103.54 inches of circumference. The tire equations are shown in FIG. 9.

Figure 10:
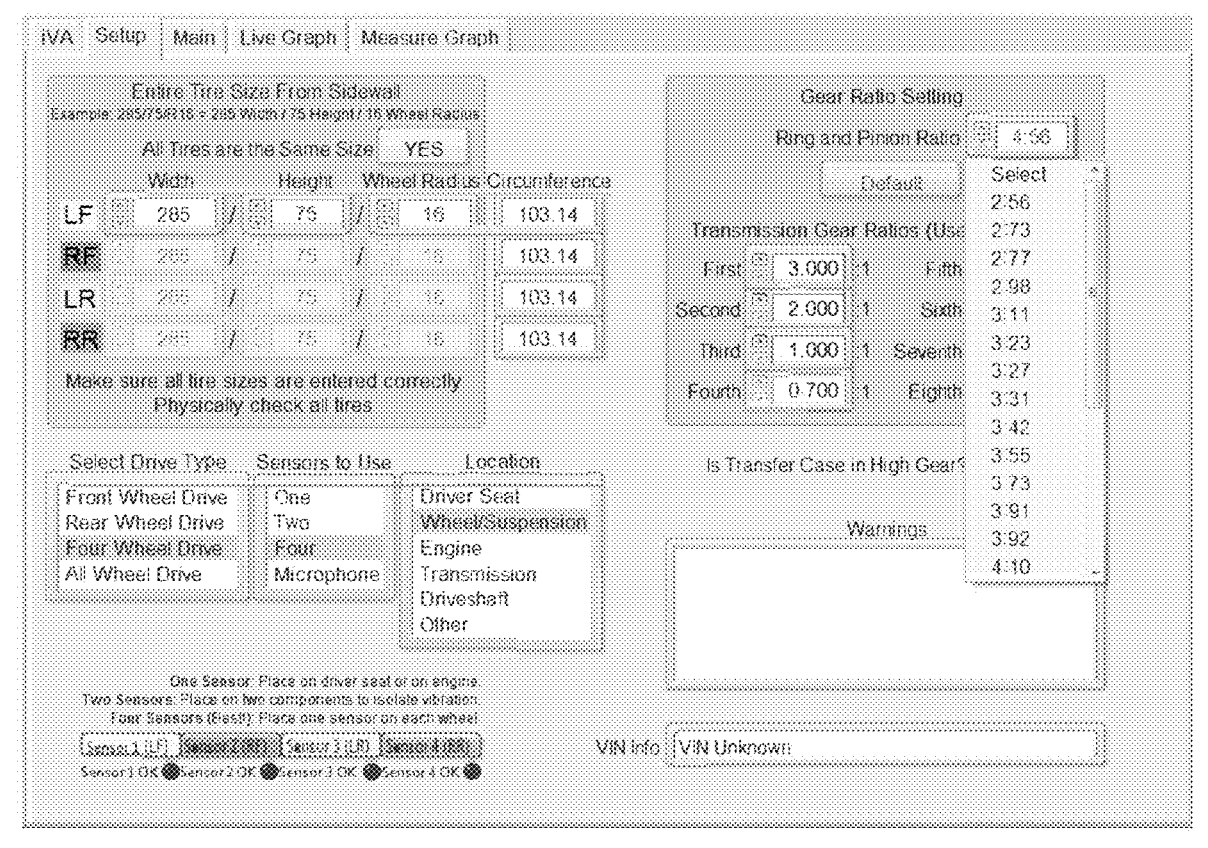

The differential gear ratio (ring and pinion) is needed in order to calculate the driveshaft rotational speed. This is provided from a pull down menu shown in FIG. 10. The ring and pinion ratio is selected, and this is used with a known tire rotational speed. So if the tire RPM is 750, and the ring and pinion is 3.92 to 1; 750×3.92=2940 RPM=driveshaft speed.

Figure 11:
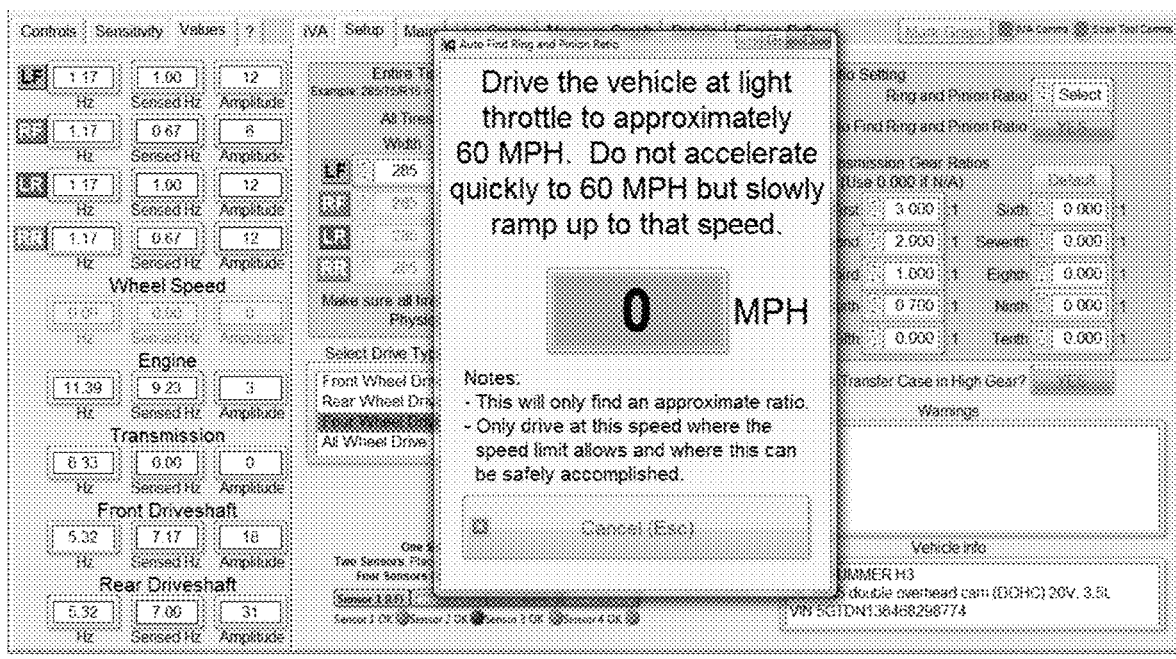
FIG. 11 shows the auto find ring and pinion ratio pop-up window.

Additionally the ring and pinion ratio can be found automatically. This preferred method is accomplished by selecting the "Auto Find Ring and Pinion Ratio" button. The IVA program will then bring up a pop-up window that instructs the service person to drive the vehicle at 60 Miles Per Hour (MPH) at light load, shown in FIG. 11. This will put the vehicle in high gear which is usually an overdrive gear. Overdrive is commonly a gear ratio of approximately 0.70 to 1. The IVA program will now monitor the VSS for a speed between >55 and <65 MPH. When the speed is between these two targets a timer is started. If the vehicle speed stays in this window for 10 seconds an algorithm is run that calculates the ring and pinion ratio. This algorithm reads the VSS and then calculates the tire RPM. The engine RPM is then read and is divided by the transmission overdrive gear ratio of 0.70. An example would be; if engine RPM is 2200/.70=3142 transmission output RPM; 3142 RPM/Tire RPM 750=4.19 Ring and Pinion Ratio. This automated procedure will calculate the approximate ring and pinion ratio, this will be close enough for the IVA to work properly. One skilled in the art could use other transmission gears other than overdrive to accomplish the same results.

In order to calculate the transmission gear ratio, the driveshaft speed is divided by the engine RPM. So if the engine RPM is 2000 and the driveshaft speed is 2800; 2000/2800=the transmission gear ratio would be 0.71. Since the transmission gear ratio can be calculated in this way the IVA program can test the transmission for proper shifting and transmission slip. If the Throttle Position Sensor (TPS), or an engine load sensor such as but not limited to a Mass Air Flow (MAF) sensor, and or a Manifold Absolute Pressure (MAP) sensor, is also acquired from the vehicles ECM, the transmission can be tested for up shifts and down shifts, along with the correct shift point and Torque Converter Clutch (TCC) engagement. If the transmission slips between shifts, just slips, or has TCC engagement issues, these problems can also be determined. For vibrations and noise can come from transmission problems such as these.

Each of these RPM readings will be converted into frequency or hertz (Hz). This is accomplished by dividing the RPM by 60. This will now represent revolutions per second, which is Hz. The data that is read from the vibration sensors is run through a Fast Fourier Transform (FFT) algorithm. This is an algorithm that converts a signal from its original domain to a representation in the frequency domain. Fourier analysis converts this accelerometer's output signal from its original domain, which in this case is the mechanical movement in time, to a representation in the frequency domain in Hz. Now that the frequency of the component is known and the frequency from the vibration sensor is known, the IVA checks the amplitude at the frequency of the component's rotational frequency. If the amplitude is greater than a programed threshold a color code is given for the vibration level.

Figure 12:
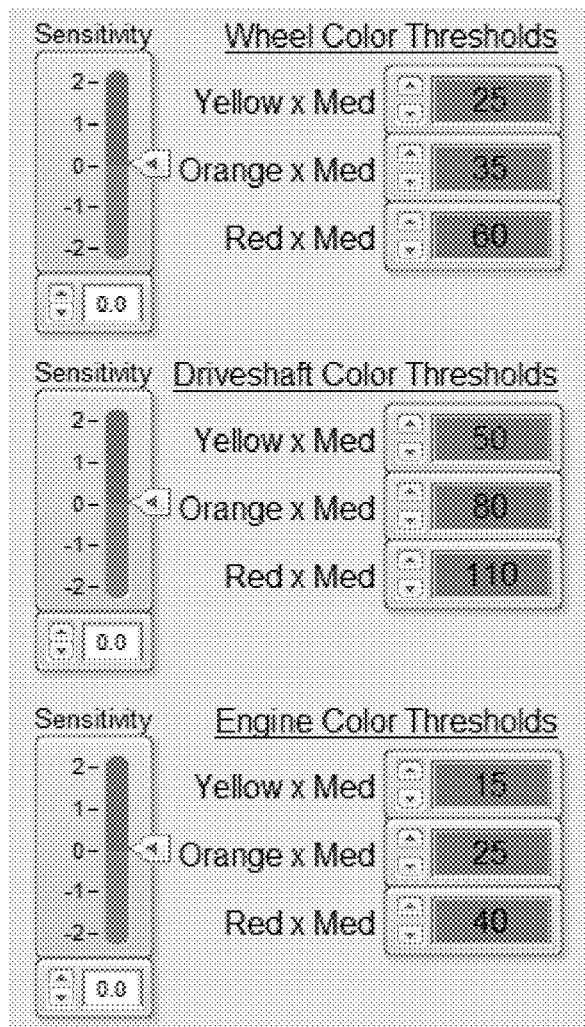
FIG. 12 shows the sensitivity adjustments and the threshold values for color coding the vibration level.

These given colors are; White no to low vibration, yellow light vibration, orange moderate vibration, and red heavy vibration. Wherein this is referred to as color coding. Anyone versed in the art could use different colors or other alerts, but the intent would be the same. This makes it easy for the service person to see the level of the vibration. These thresholds and sensitivity adjustments are shown in FIG. 12. The sensitivity for the color coding can be adjusted for wheel and suspension, engine, and driveshaft. Additionally the vibration amplitude at the Hz level is given in a digital value. This will help the service person understand the severity of the vibration.

The modern vehicle comes in many size and weight categories. Therefore the vibration from each vehicle will be different. For example, a luxury sedan's vibration concern would be much less than a 1 ton truck's vibration concern. Each vehicle has a different design target for what vibration and noise level is acceptable.

As can be seen in FIG. 12, there are adjustable sliders that can manually be adjusted. This will allow the service person to adjust the scale of the IVA to the vehicle that is being diagnosed. The scaling will change the thresholds of the color coding so a color code will occur. In this way if a vibration is not being color coded due to a light vibration, but the service person can feel such a vibration, the service person can adjust the sensitivity of the color code threshold value applied to the vibration. This will allow the origin of the vibration to be seen at a glance. Even if the color code level changes due to the sensitivity adjustment, the digital representation of the vibration remains the same.

Figure 13:
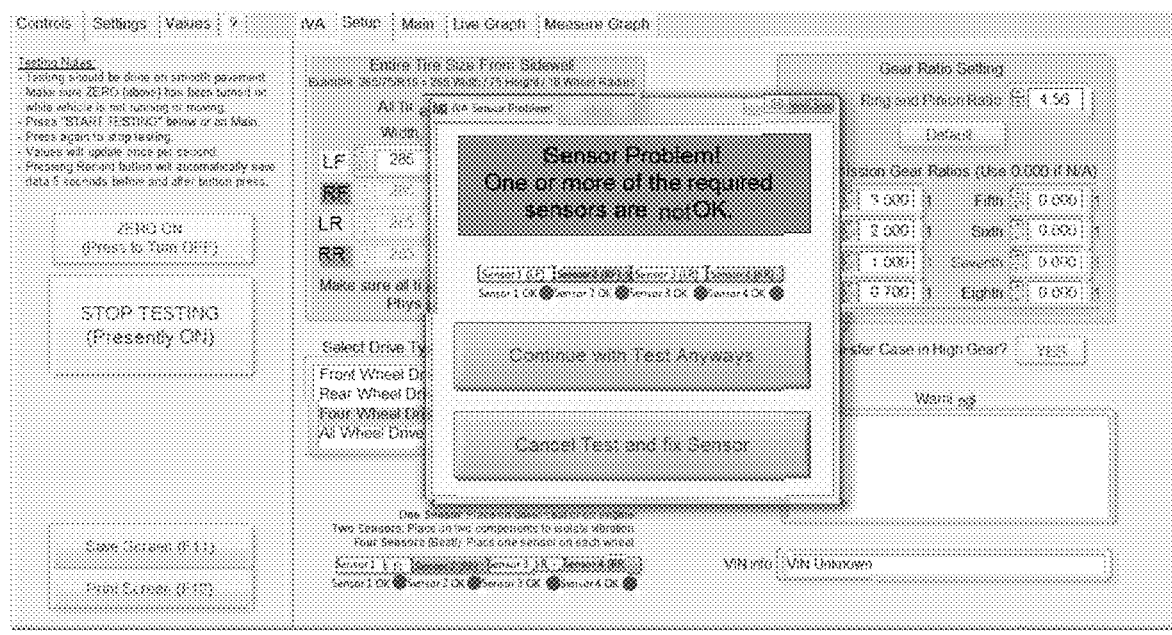
FIG. 13 shows the test that indicates if the connection to the IVA vibration sensors is bad.

In the preferred embodiment of the invention, the four vibration sensors (4) (5) (6) (7) are attached to the suspension of the vehicle under test (not shown). The VCI (9) is plugged into the DLC (not shown) of the vehicle, and the vehicle is started. In the preferred embodiment the Intelligent Vehicle Vibration Analyzer (IVA) program is run on a Personal Computer (PC), or microprocessor with display and interface screen (1), by opening the IVA program. The program checks the voltage readings from each sensor to verify that the vibration sensor has a good connection to the DAQ (2), as shown in FIG. 13. If the sensor's reading is within a given range then the sensor has a good connection and no message is displayed.

Figure 1:
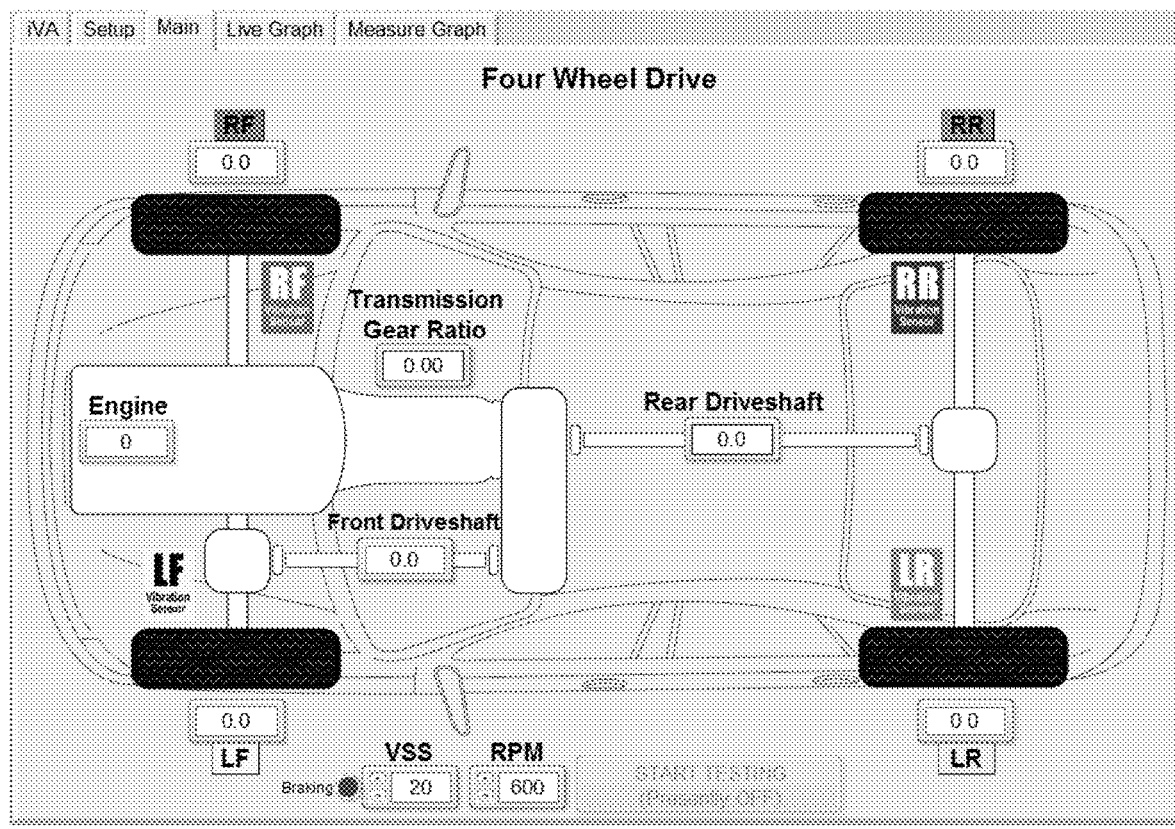
FIG. 1 illustrates where the IVA vibration sensors are located.
Figure 2:
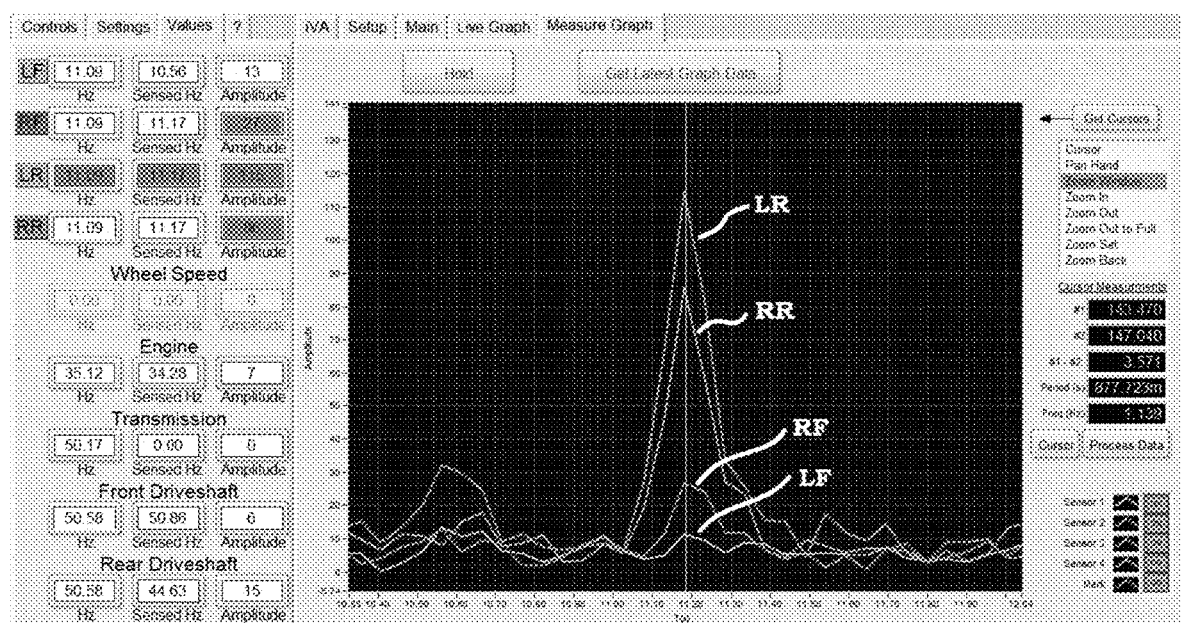
FIG. 2 shows the amplitude produced from each IVA vibration sensor at different frequencies.
Figure 3:
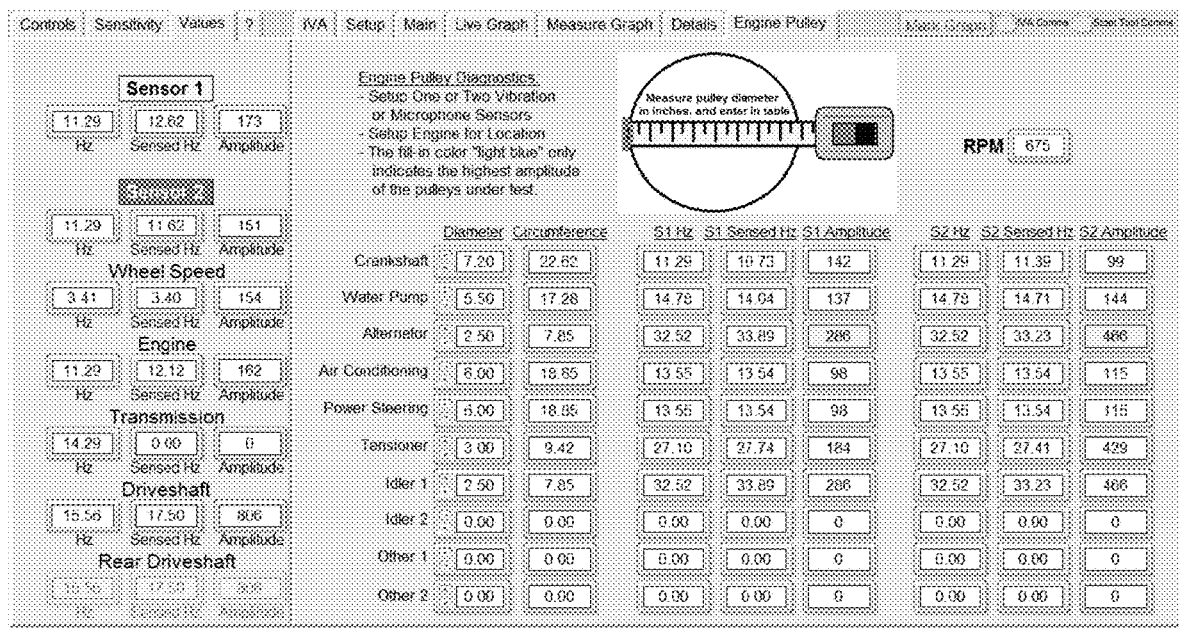
FIG. 3 shows the engine pulley setup.
Figure 4:
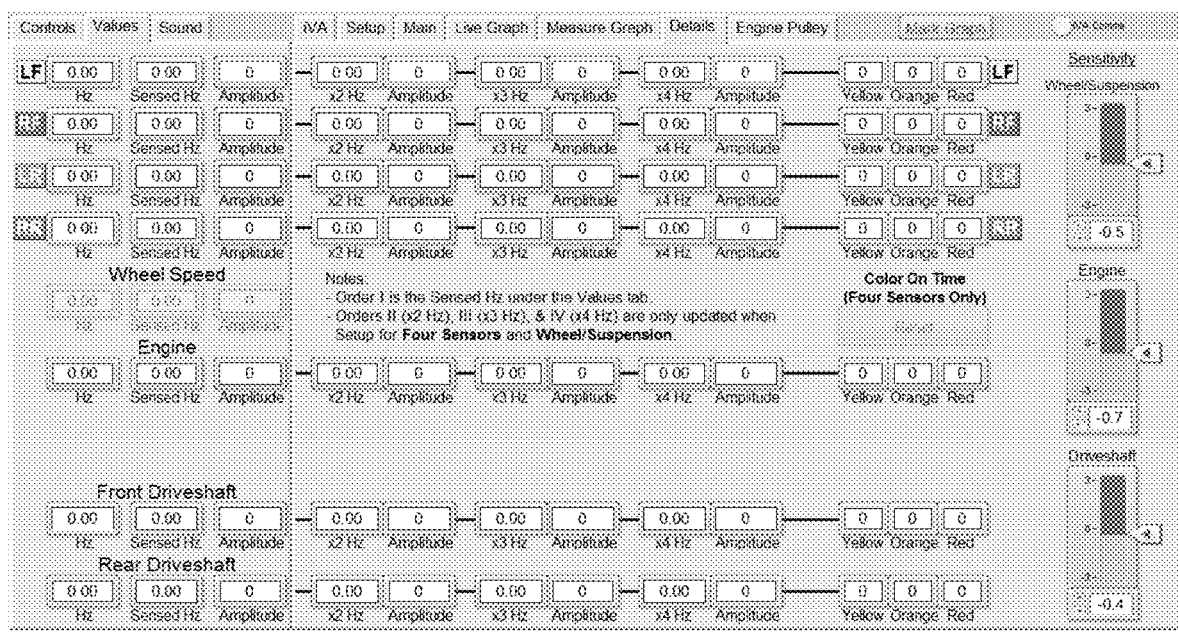
FIG. 4 shows the detail screen with the orders of vibration, vibration history, and sensitivity adjustments.
Figure 5:
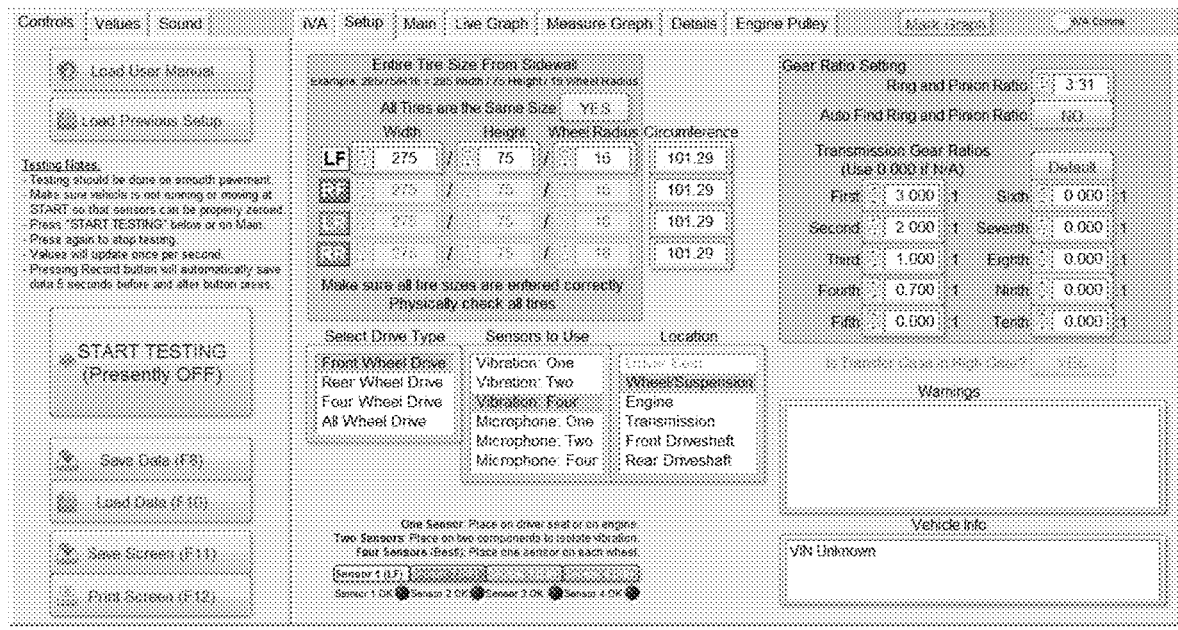
FIG. 5 shows the setup for the vehicle under test.
Figure 6:
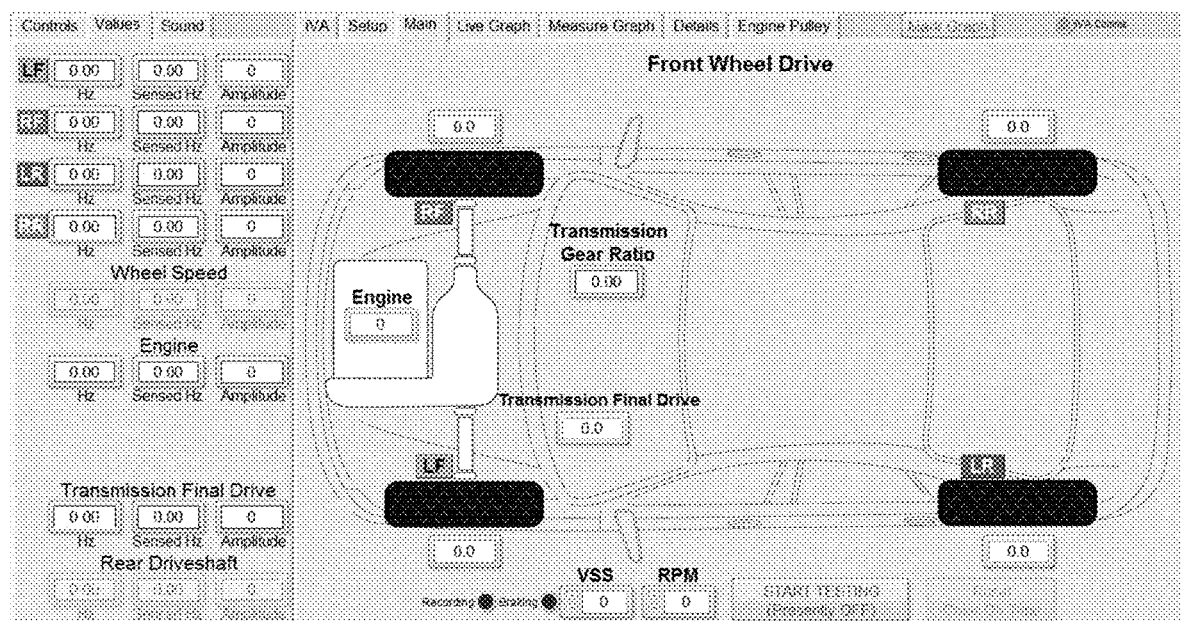
FIG. 6 shows the values tab and main tab.
Figure 14:
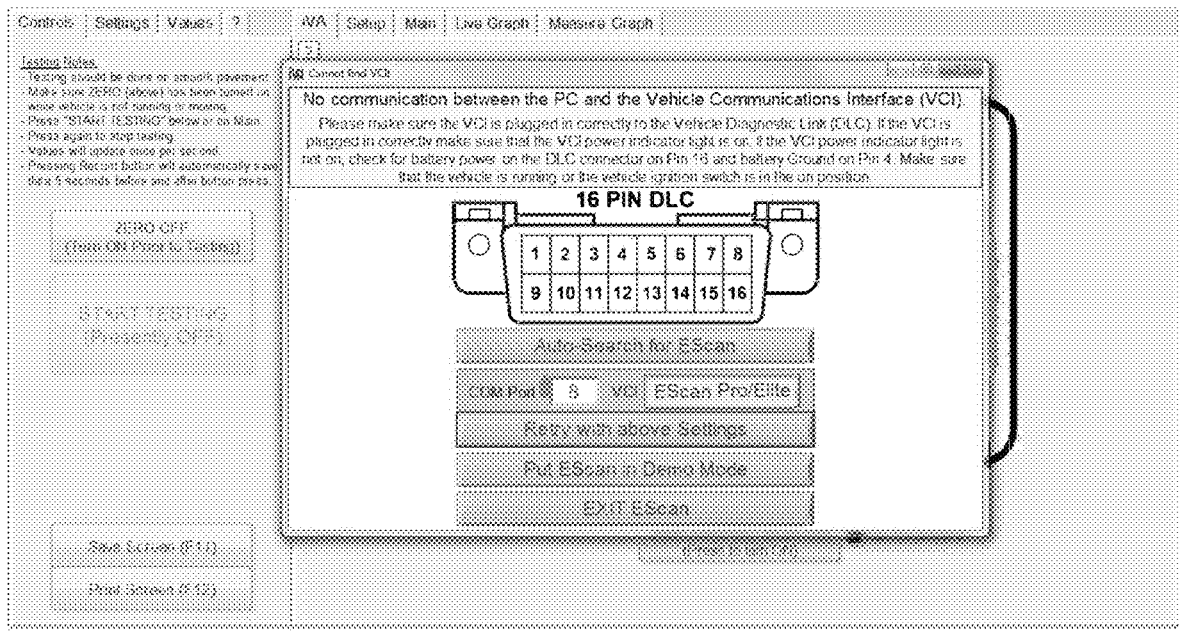
FIG. 14 shows the test that indicates if the communication to the vehicle is not working.
Figure 15:
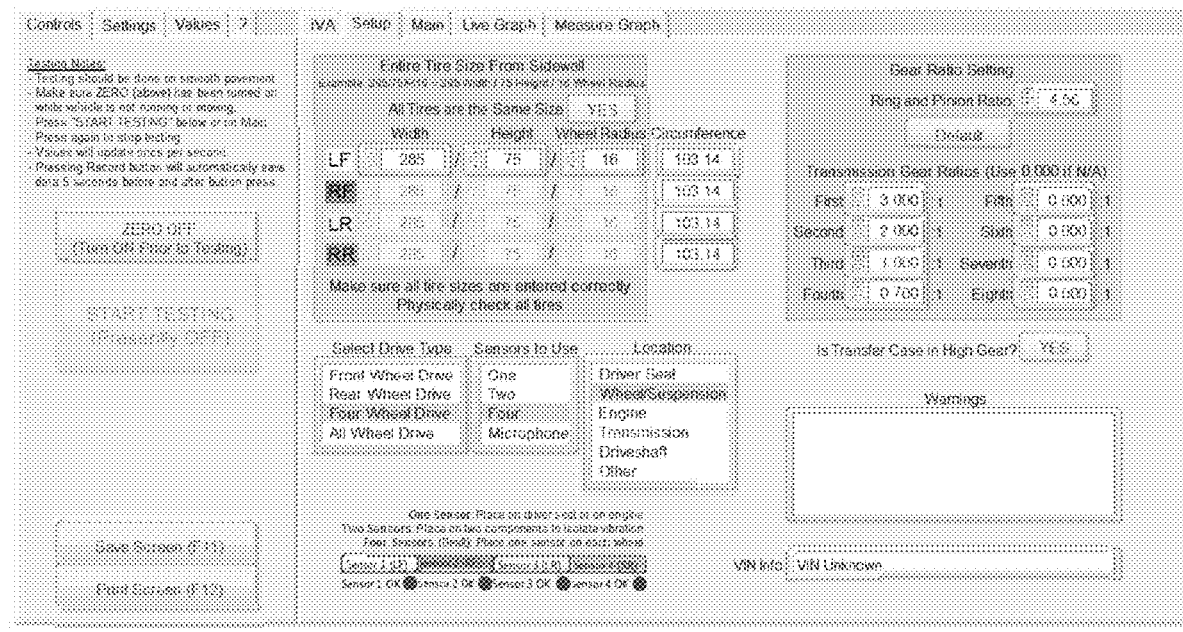
FIG. 15 shows the vehicle setup completed.

The IVA program then checks the data from the DLC, if the data is not present a message is displayed as shown in FIG. 14. If the data from the DLC is present no message is displayed. The IVA program can be run in a manual mode if no data is present from the DLC. This is where the service person will fill in the vehicle speed and engine RPM. The IVA program setup is then completed as shown in FIG. 15. The vehicle setup will need the correct tire size(s) and gear ratios entered for proper testing of the vehicle. The "Start Testing" button is then pressed and the IVA program changes the screens to the "Value" tab, and the "Main" Tab, shown in FIG. 6. The vehicle is now driven and the IVA will monitor the sensors output and automatically alert the service person when the vibration thresholds are crossed.

The data is then streamed from the DAQ (2) to the microprocessor (1) and analyzed. The data is run through the FFT algorithm once per second. This allows for near real time data readings from the IVA to be displayed. This data can be displayed in a digital format or a FFT graph based display. The vehicle is then run where the vibration is present. The IVA program monitors the data and automatically alerts the service person to a vibration problem from each component, such as the; engine, transmission, drive axles, drive shafts, differentials, wheels assemblies, and brakes.

Figure 16:
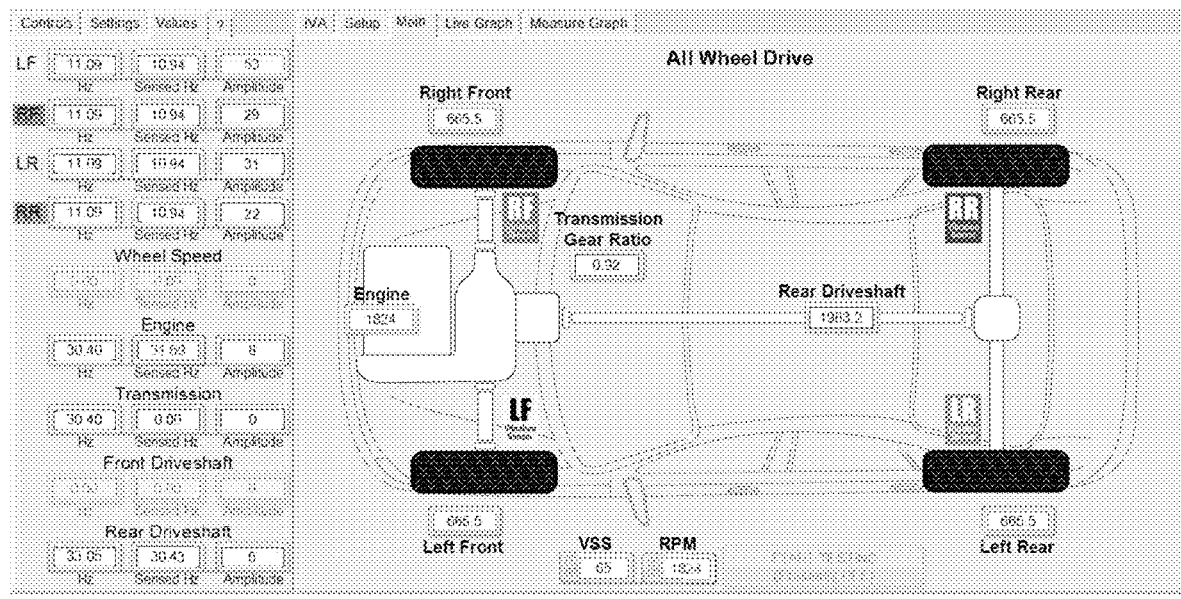
FIG. 16 shows an all-wheel drive vehicle with a vibration coming from the LF wheel assembly.
Figure 17:
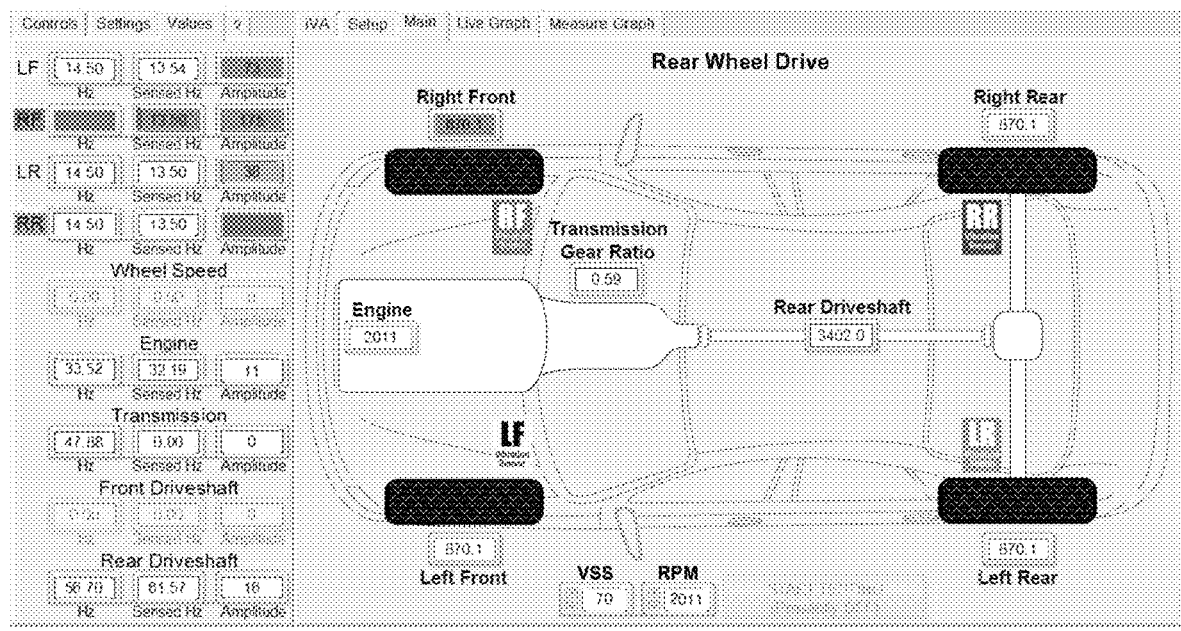
FIG. 17 shows a rear wheel drive vehicle with a vibration coming from the RF wheel assembly.
Figure 18:
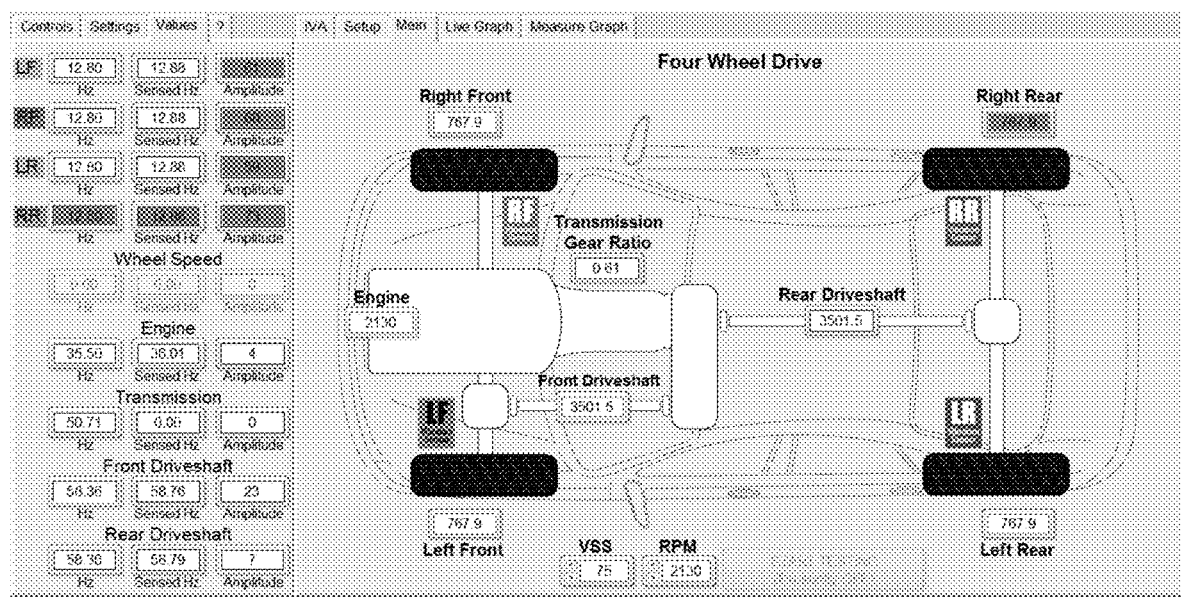
FIG. 18 shows a four wheel drive vehicle with a vibration coming from the RR wheel assembly.
Figure 19:
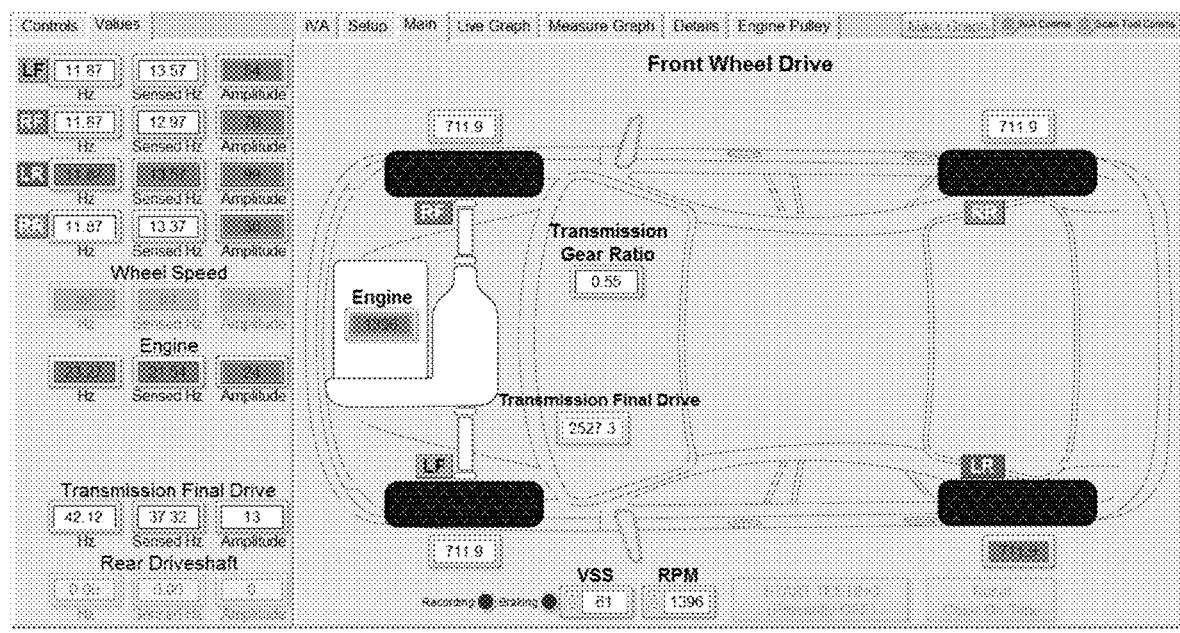
FIG. 19 shows a front wheel drive vehicle with a vibration coming from the RL wheel assembly.

Once the IVA locates the problem the program shows the vibrating component by applying a color to the component. This alerts the service person to the presence of a vibration and where the vibration is coming from, for example; FIG. 16 shows an all-wheel drive vehicle with a vibration coming from the LF wheel assembly. FIG. 17 shows a rear wheel drive vehicle with a vibration coming from the RF wheel assembly. FIG. 18 shows a four wheel drive vehicle with a vibration coming from the RR wheel assembly. FIG. 19 shows a front wheel drive vehicle with a vibration coming from the LR wheel assembly.

Figure 20:
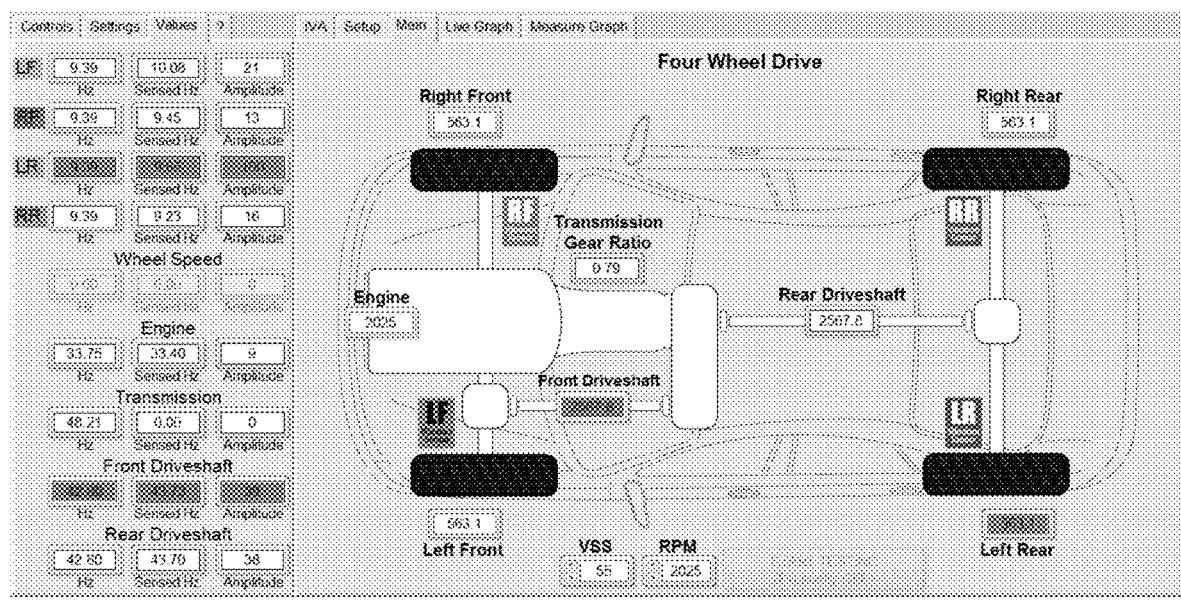
FIG. 20 shows a four wheel drive with a vibration coming from the front drive shaft and the RL wheel assembly.
Figure 21:
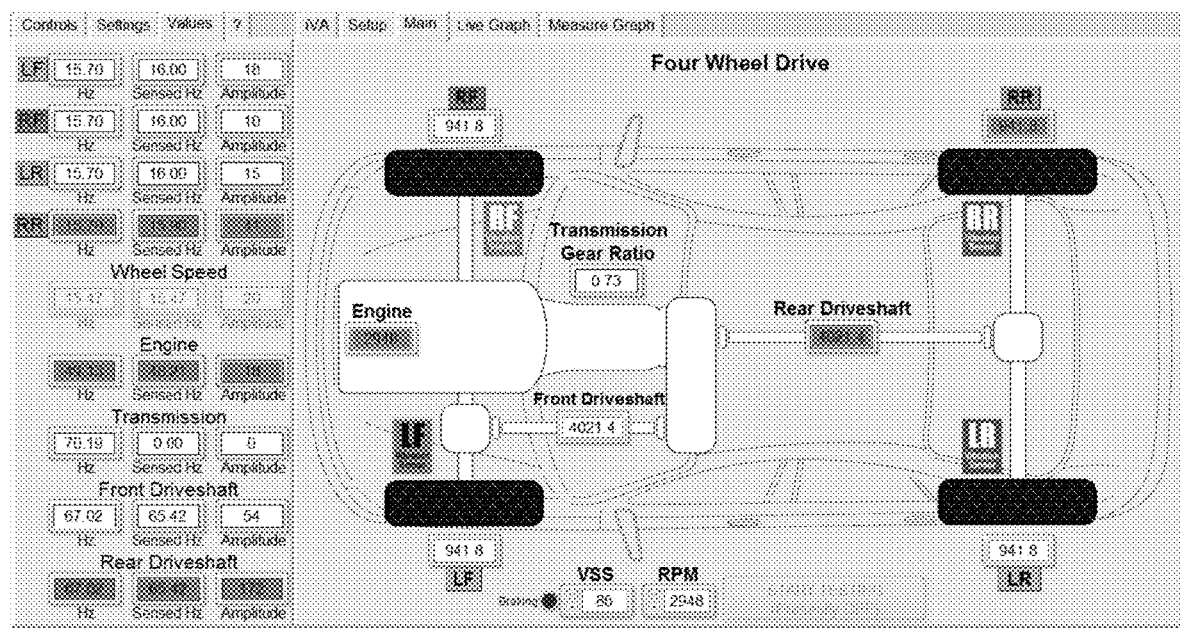
FIG. 21 shows a four wheel drive with a vibration coming from the rear drive shaft.
Figure 22:
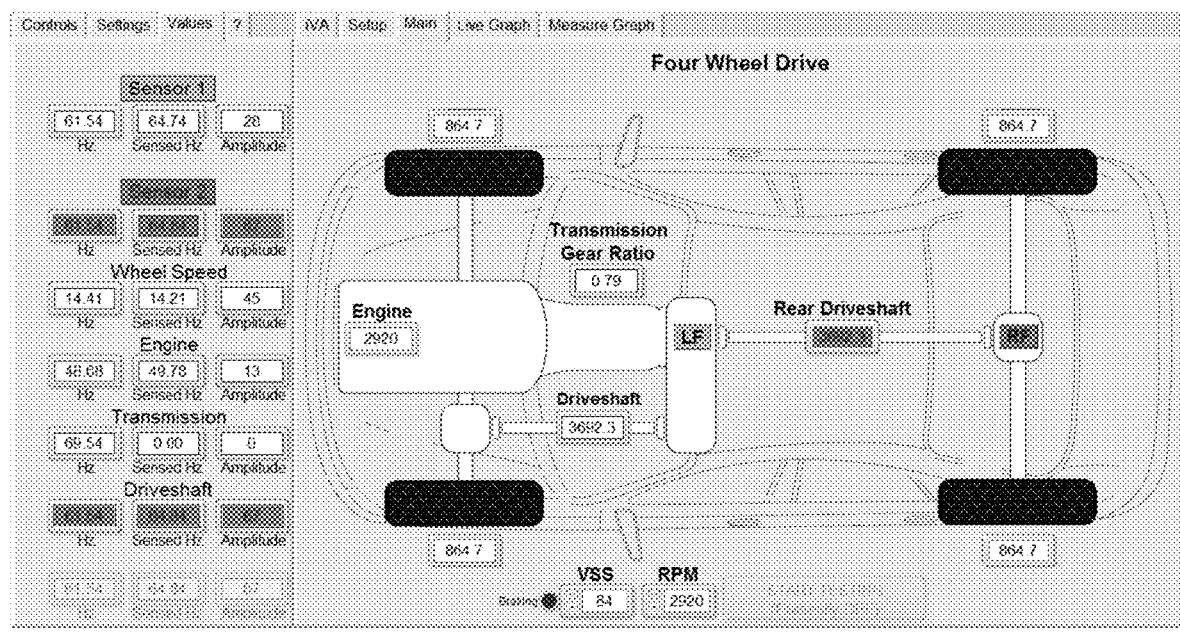
Figure 23:
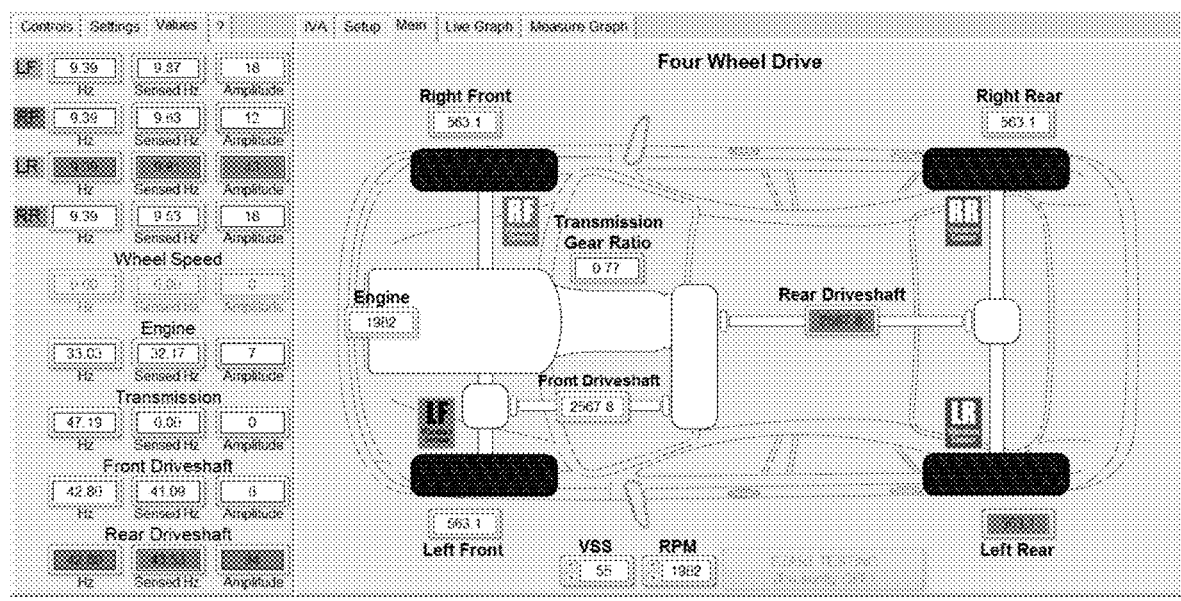
FIG. 23 four wheel drive vehicle with a vibration coming from the rear drive shaft and the RL wheel assembly.

FIG. 20 shows a four wheel drive with a vibration coming from the front drive shaft and the LR wheel assembly. These vibrations are occurring at the same time. The IVA quickly finds both vibrations and alerts the service person that there are two different problems on the vehicle under test. FIG. 21 shows a four wheel drive with a vibration coming from the rear drive shaft. FIG. 22 shows the four wheel drive that is shown in FIG. 21 using the Two Sensor mode to locate where the vibration is coming from. This is where one sensor is attached on one component and a second sensor is attached to a different component. The IVA program now compares the two sensors and finds which sensor has a greater amplitude, thus locating the origin of the vibration. FIG. 23 shows a four wheel drive vehicle with a vibration coming from the rear drive shaft and the LR wheel assembly. These vibrations are being produced at the same time. The IVA program easily locates both vibrations and alerts the service person to the fact there are two problems on the test vehicle.

Figure 24:
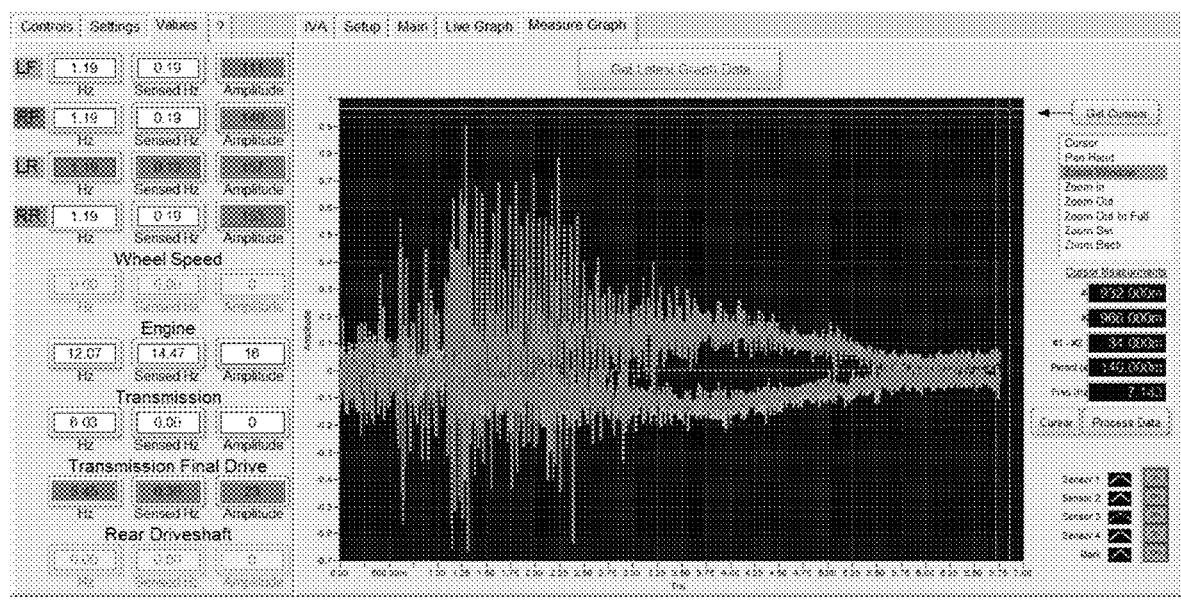
FIG. 24 shows a vehicle with a brake vibration coming from the LR brake assembly.
Figure 25:
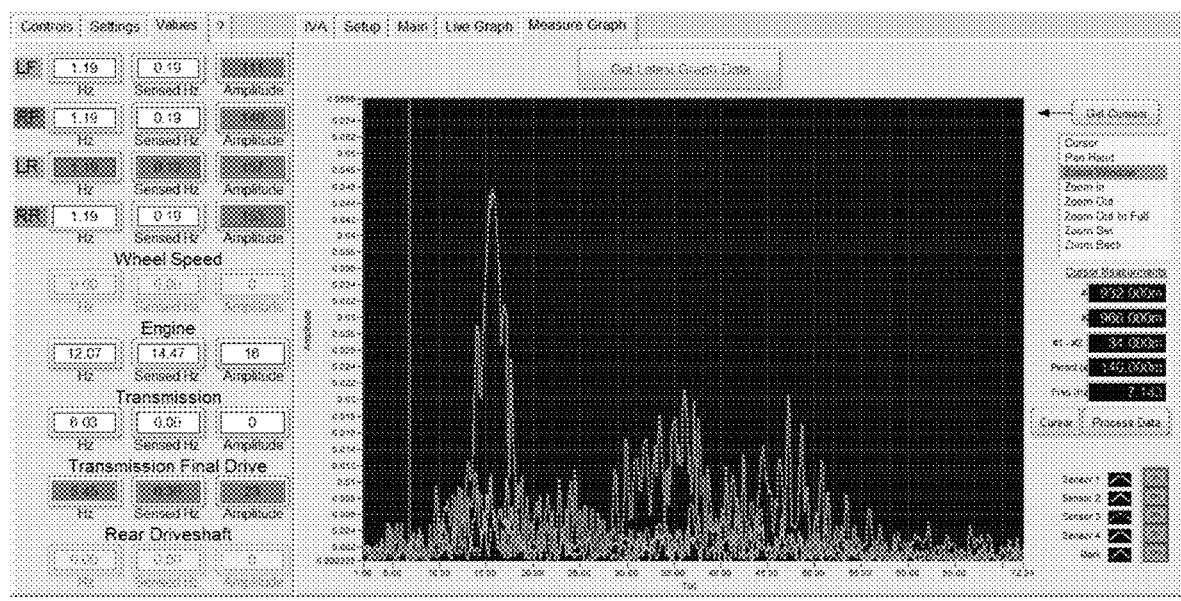
FIG. 25 shows the data after running the FFT algorithm on it.
Figure 26:
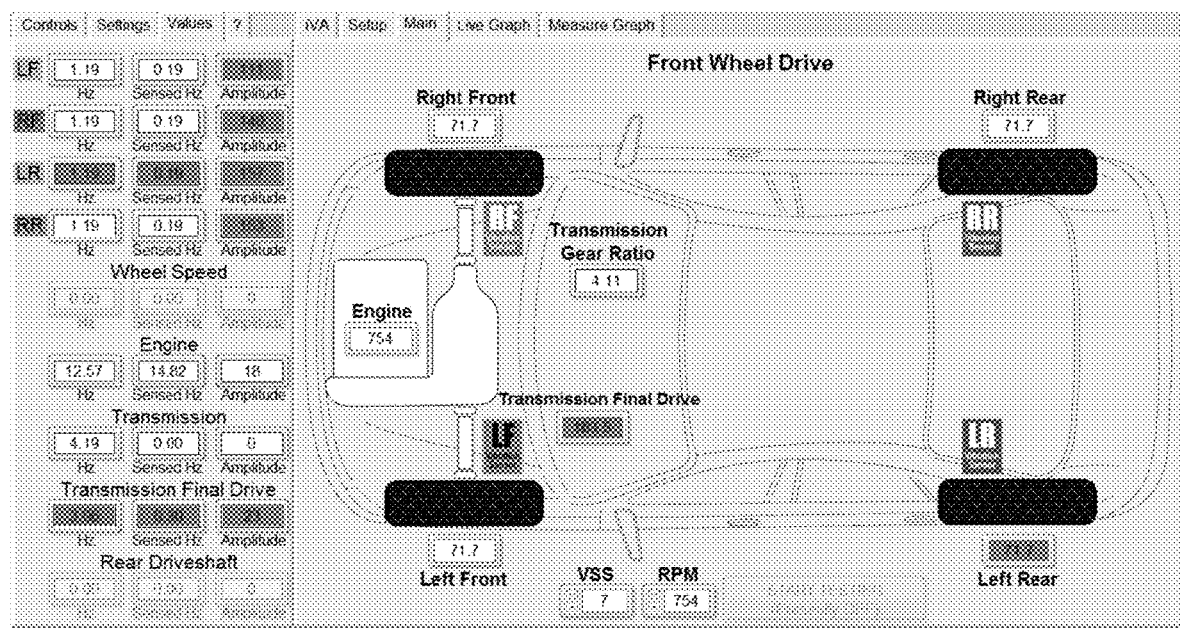
FIG. 26 shows the data after it is processed and displayed.

FIG. 24 shows a vehicle with a brake vibration coming from the LR brake assembly. FIG. 25 shows the data after running the FFT algorithm on it. FIG. 26 shows the data after it is processed and displayed.

Additionally it has been found through testing that microphones can be utilized. With this method the sound being emitted from components can be processed with the FFT. This will provide the frequency that the sound was produced from.

Figure 27:
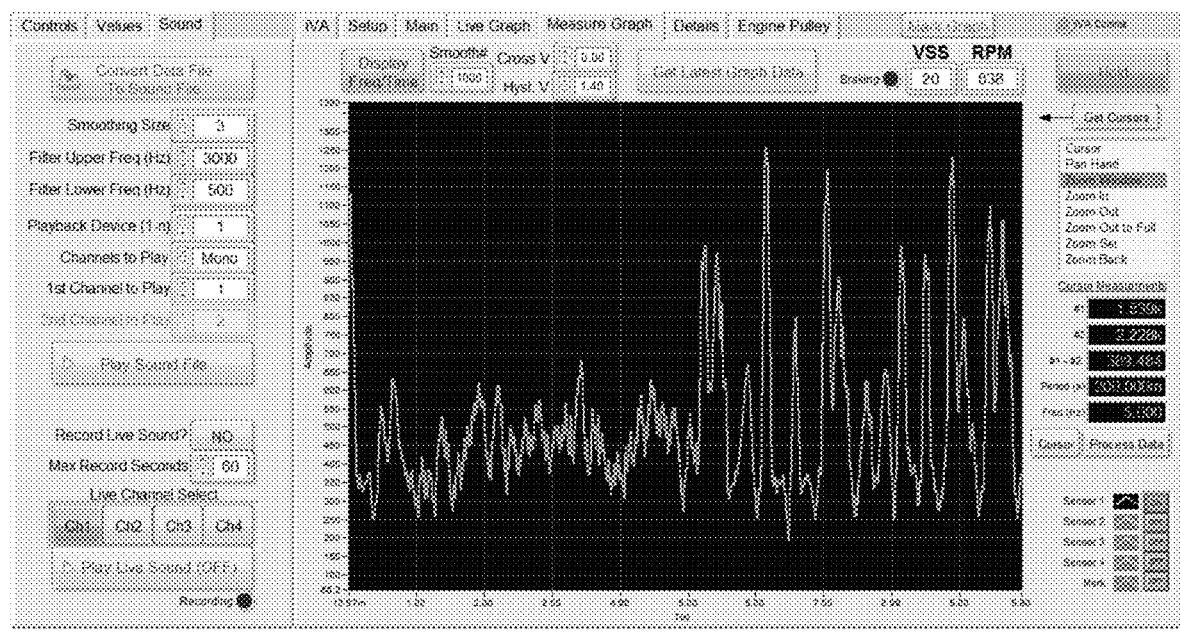
FIG. 27 shows a frequency graph from the sound waves produced from the rotating components, in this case a running engine.

It has also been determined that if a frequency plot is created by measuring the time between the sound signal crossing a threshold, problems can be found. The threshold is found by using the average signal level of the sound waveform. The points used for the frequency plot are created by measuring the times between each point that the sound waveform crosses the threshold and then taking the reciprocal of these times to convert from time in seconds to frequency in Hz. These frequencies are then plotted on a graph to show problems. In FIG. 27 an example of a frequency plot for a running engine is shown.

Additionally through testing it has been found that if a microphone's data is graphed the location of such a sound can be located. Sounds are part of a vehicle's normal operation. When these sounds become loud enough that the occupants can distinguish them from the normal operation, then this is noise. The origin of this noise can be very difficult to locate. Perhaps one of the most difficult sounds to isolate is a suspension chassis pop. For instance, this can occur when hitting road bumps or when the vehicle is pulling into a driveway. When the pop occurs the sound travels throughout the vehicle. When listening for this noise it can usually be isolated to a corner of the suspension, but it seems as though all the components on the suspension corner are making the same popping noise.

Figure 28:
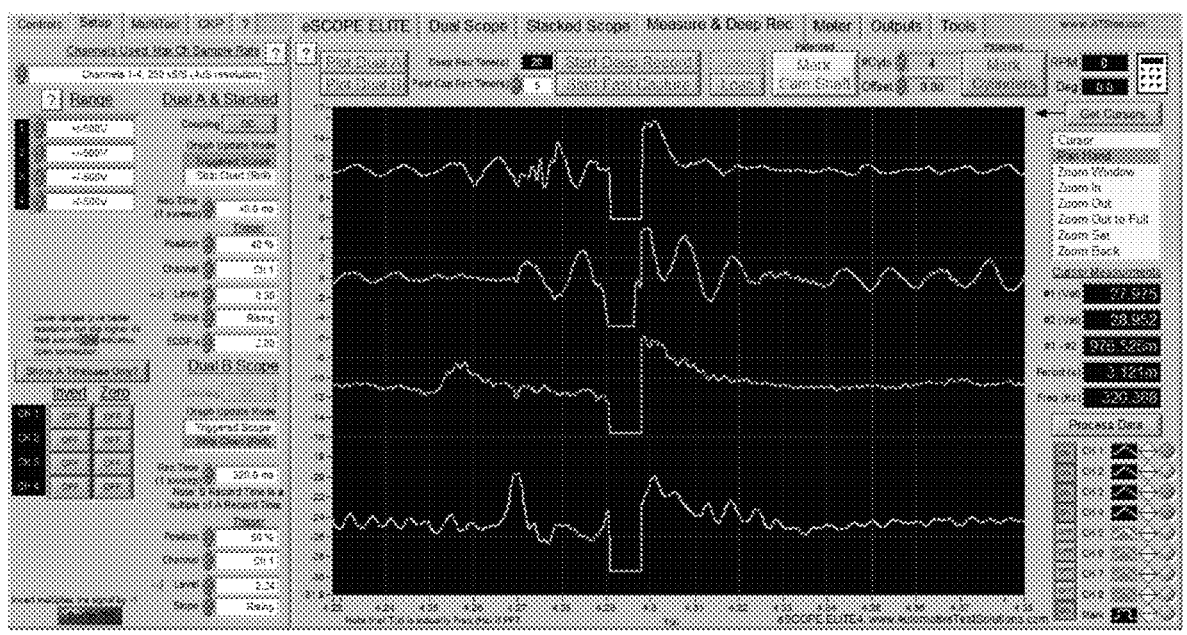
FIG. 28 shows sound waves graphed from a popping noise on a suspension of a vehicle.

When these popping noises occur it is much easier to find the origin of the popping sound by using microphones. However, if a service person was to listen to these microphones they would still be unable to determine the origin of the noise. When this popping noise occurs it emanates through all of the components. This is due to all of the components being connected to each other, and sound travels through metal easier than it does through air. Metal is denser than air which allows the sound vibration to travel at a faster rate through metals or solids. However if the service person were to graph the microphone's output it becomes much easier to identify the origin of the pop, as seen in FIG. 28. There are four microphones attached to the vehicle's suspension system. The yellow trace (top) is connected to the lower ball joint, the red trace (second from top) is connect to the strut, the green trace (third from top) is connected to the tie rod, the blue trace (fourth from top) is connected to the strut top. The sound is emitting from the component that rings out like a bell. This can be seen on the red trace (second from top) and indicates that the strut is creating the popping sound.

It is clear from the disclosure provided above that the IVA is a superior method to find vibrations over prior art. The prior art exhibits many problems as identified above. The IVA's novel methods overcome the limitations of the prior art methods.

Whereas the drawings and accompanying description have shown and described the preferred embodiments of the present invention, it should be apparent to those skilled in the art that various changes may be made in the forms and uses of the inventions without affecting the scope thereof.

The invention claimed is:

1. A method of identifying a location of a vibration source in a vehicle; the vehicle having suspension components and having rotating components that can cause a vibration; the method comprising the steps of:
   mounting four vibration sensors with the vehicle, where each of the four vibration sensors is mounted on a suspension component at a distinct corner of the vehicle, and wherein each vibration sensor outputs a signal indicating the magnitude of vibrations sensed by the sensor at each of a plurality of frequencies;
   monitoring the signal from each of the vibration sensors;
   comparing the frequency of vibrations expressed in each signal to rotational frequencies of multiple component types of the vehicle, and identifying a candidate vibration source component type as a component type whose first order, second order, third order, or fourth order vibration frequency matches that of the frequency of vibrations expressed in the one or more signals;
   analyzing differences in magnitudes of the signals from the vibration sensors at the rotational frequency of the candidate vibration source component type to determine a location of the candidate vibration source component type as the location of the vibration source.

2. The method as set forth in claim 1, further comprising connecting to the vehicle's Data Link Connection (DLC) and reading a parameter comprising at least one of: vehicle speed sensor, and engine revolutions per minute, from a vehicle engine control module, and using the parameter to determine the rotational frequency of at least one component type of the vehicle.

3. The method as set forth in claim 1, further comprising providing a graphical representation of the vehicle to a user, and providing an alert to the user, wherein the alert comprises color coding on the graphical representation the component that is the vibration source.

4. The method as set forth in claim 3, wherein the color coding uses at least one of the alert colors of: white, yellow, orange, and/or red.

5. The method as set forth in claim 1, wherein the alert comprises a is one of sound provided to the user.

6. The method as set forth in claim 5, wherein the sound is a voice that indicates the vibration source.

7. The method as set forth in claim 1, wherein the vibration sensors are accelerometers each sensing vibration along three mutually orthogonal axes.

8. The method as set forth in claim 7, wherein the signal from each vibration is a summation of the vibration sensed along the three axes of the accelerometer.

9. The method as set forth in claim 1, further comprising accessing a vehicle's identification number from a vehicle engine control module and determining rotational frequencies of various component types of the vehicle from the vehicle's identification number.

10. The method as set forth in claim 1, further comprising storing a history of the signals from the vibration sensors and displaying the history to a user.

11. An apparatus for the location of a vibration source in a vehicle, comprising:
    a plurality of sensors, each adapted to be mounted with the vehicle at a location distinct the mounting locations of others of the plurality of sensors;
    a processor system, comprising a processor and a storage system, wherein the storage system contains instructions that cause the processor to:
      monitor the signal from each of the vibration sensors;
      compare the frequency of vibrations expressed in each signal to rotational frequencies of multiple component types of the vehicle, and identify a candidate vibration source component type as a component type whose first order, second order, third order, or fourth order vibration frequency matches that of the frequency of vibrations expressed in the one or more signals;
      analyze differences in magnitudes of the signals from the vibration sensors at the rotational frequency of the candidate vibration source component type to determine a location of the candidate vibration source component type as the location of the vibration source.

* * * * *